(12) United States Patent
Higashiguchi

(10) Patent No.: US 10,442,454 B2
(45) Date of Patent: Oct. 15, 2019

(54) WORK VEHICLE

(71) Applicant: YANMAR CO., LTD., Osaka-shi, Osaka (JP)

(72) Inventor: Gaku Higashiguchi, Osaka (JP)

(73) Assignee: YANMAR CO., LTD., Osaka (JP)

(*) Notice: Subject to any disclaimer, the term of this patent is extended or adjusted under 35 U.S.C. 154(b) by 163 days.

(21) Appl. No.: 15/493,419

(22) Filed: Apr. 21, 2017

(65) Prior Publication Data

US 2017/0217473 A1 Aug. 3, 2017

Related U.S. Application Data

(63) Continuation of application No. PCT/JP2015/078382, filed on Oct. 6, 2015.

(30) Foreign Application Priority Data

Oct. 24, 2014 (JP) .................................. 2014-217215
Apr. 13, 2015 (JP) .................................. 2015-082009

(51) Int. Cl.
*B62D 1/04* (2006.01)
*B60K 37/04* (2006.01)
(Continued)

(52) U.S. Cl.
CPC .............. *B62D 1/046* (2013.01); *B60K 37/04* (2013.01); *B60K 37/06* (2013.01); *B60R 16/023* (2013.01);
(Continued)

(58) Field of Classification Search
CPC ........ B62D 1/046; B60K 35/00; B60K 37/04; B60Q 5/003
See application file for complete search history.

(56) References Cited

U.S. PATENT DOCUMENTS 3,524,032 A * 8/1970 Conterno ............... B60Q 5/003
200/61.54
3,857,454 A 12/1974 Kobayashi et al.
(Continued)

FOREIGN PATENT DOCUMENTS

JP 63-108863 U 7/1988
JP 2000-289491 A 10/2000
(Continued)

OTHER PUBLICATIONS

Korean Office Action dated Feb. 19, 2019 issued in corresponding KR Application 10-2017-7009626 cites the patent document above.
(Continued)

*Primary Examiner* — Thomas C Diaz
(74) *Attorney, Agent, or Firm* — Norton Rose Fulbright US LLP

(57) ABSTRACT

The invention aims at providing a work vehicle in which an operator can easily view each of switches in spite of the work vehicle in which a plurality of switches such as a DPF regeneration switch, a working switch and a one-touch automatic switch are concentrically provided on a front surface of a control seat. In a work vehicle having a cabin which is inward provided with a control seat installed in a travel machine body, a DPF regeneration switch, a working switch, and a one-touch automatic switch are provided. The DPF regeneration switch is provided on an upper surface of a steering column in a base portion of a control steering wheel, and the DPF regeneration switch is arranged in a field of vision of an operator under a straight moving work posture.

17 Claims, 30 Drawing Sheets

(51) Int. Cl.
| | |
|---|---|
| *B60R 16/023* | (2006.01) |
| *B62C 1/08* | (2006.01) |
| *B62D 1/10* | (2006.01) |
| *B62D 1/185* | (2006.01) |
| *B62D 1/189* | (2006.01) |
| *B62D 1/18* | (2006.01) |
| *B60K 37/06* | (2006.01) |
| *B62D 49/06* | (2006.01) |
| *B62D 21/18* | (2006.01) |

(52) U.S. Cl.
CPC ............... *B62C 1/08* (2013.01); *B62D 1/10* (2013.01); *B62D 1/18* (2013.01); *B62D 1/185* (2013.01); *B62D 1/189* (2013.01); *B62D 49/06* (2013.01); *B60K 2370/61* (2019.05); *B60Y 2200/221* (2013.01); *B62D 21/186* (2013.01)

(56) References Cited

U.S. PATENT DOCUMENTS

| | | | | |
|---|---|---|---|---|
| 4,352,401 A | * | 10/1982 | Vitaloni | ............ B60K 35/00 180/90 |
| 8,474,562 B2 | * | 7/2013 | Elhardt | ............ B60K 37/00 180/89.12 |

FOREIGN PATENT DOCUMENTS

| | | |
|---|---|---|
| JP | 2001-120008 A | 5/2001 |
| JP | 2003-143924 A | 5/2003 |
| JP | 3657249 B2 | 6/2005 |
| JP | 2006-233833 A | 9/2006 |
| JP | 2008-184143 A | 8/2008 |
| JP | 2013-112104 A | 6/2013 |
| JP | 2013-181406 A | 9/2013 |
| JP | 2014-015058 A | 1/2014 |
| KR | 10-2007-0030667 A | 3/2007 |

OTHER PUBLICATIONS

Korean Office Action dated Aug. 24, 2018 issued in corresponding KR Application 10-2017-7009626 cites the patent document above.
Japanese Allowance dated Feb. 27, 2019 issued in corresponding JP Application 2015-082009 cites the patent document above.

* cited by examiner

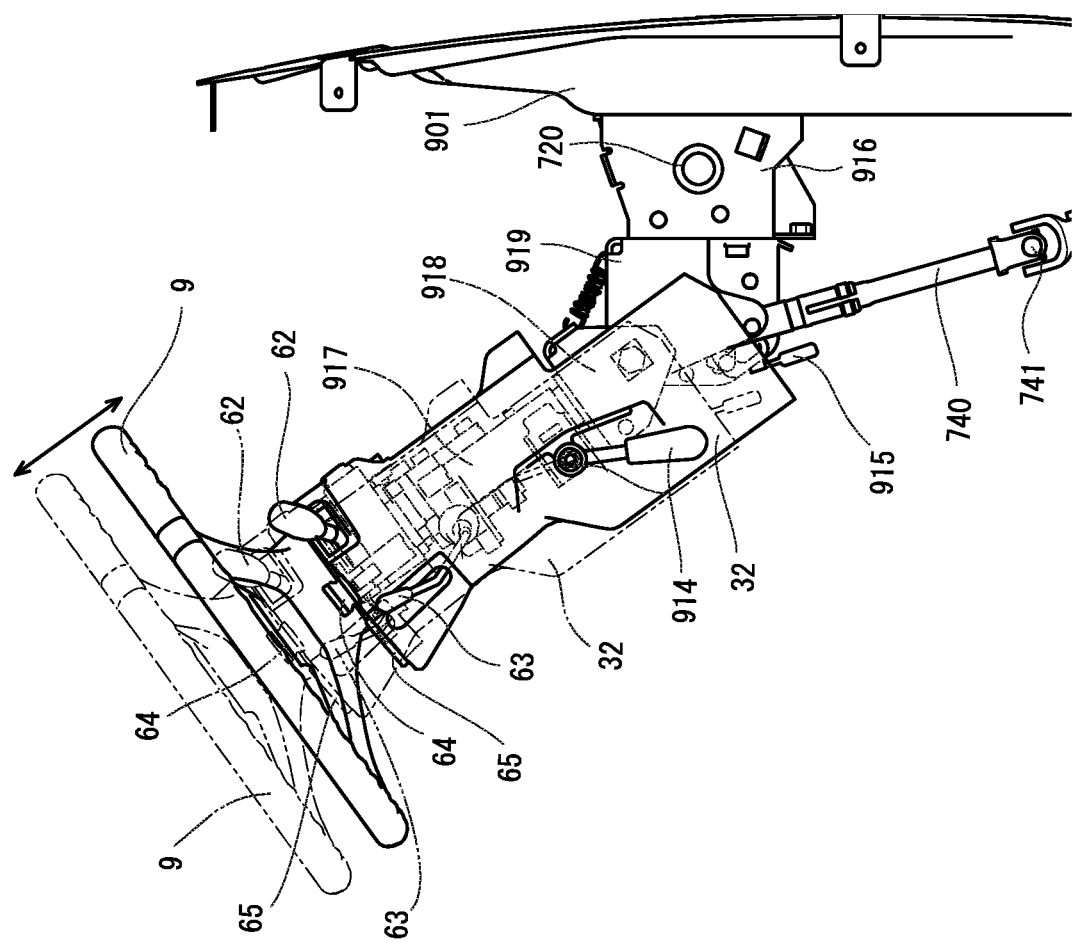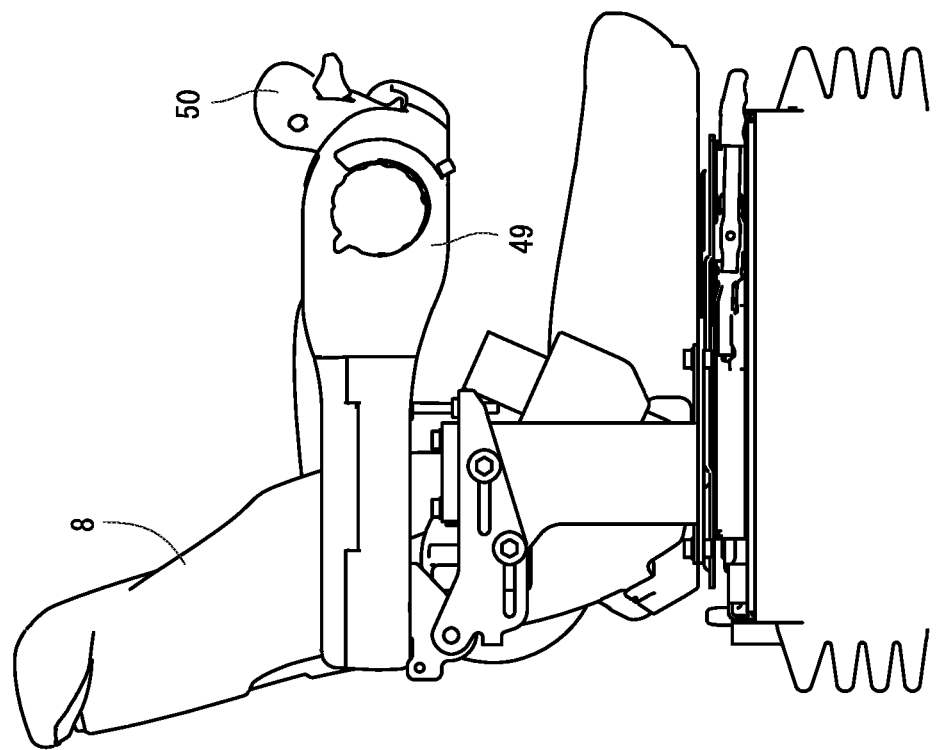
FIG.20

WORK VEHICLE

CROSS-REFERENCE TO RELATED APPLICATIONS

The present application is a continuation application of International Application No. PCT/JP2015/078382, filed Oct. 6, 2015, which claims priority to Japanese Patent Application No. 2014-217215, filed Oct. 24, 2014, and Japanese Patent Application No. 2015-082009, filed Apr. 13, 2015. The contents of these applications are incorporated herein by reference in their entirety.

BACKGROUND OF THE INVENTION

The present invention relates to a work vehicle.

In the work vehicle such as the tractor or the wheel loader, there are arranged around a control seat a control steering wheel for operating to steer a travel machine body and a plurality of lever members for setting and adjusting a traveling state of the travel machine body, taking an operability into consideration. For example, the tractor for the agricultural work has a main transmission lever, a sub transmission lever, a forward and backward movement switching lever, and a PTO shift lever, as a plurality of lever members (refer to Japanese Unexamined Patent Application Publication No. 2013-112104). The main transmission lever is structured such as to operate to change a vehicle speed of the travel machine body, and the sub transmission lever is structured such as to set and retain a transmission output of a transmission to a predetermined range. The forward and backward movement switching lever is structured such as to operate to switch a moving direction of the travel machine body to a forward movement and a backward movement, and the PTO shift lever is structured such as to operate to shift an output (a PTO driving force) to the working machine.

Further, the work vehicle mounts on the travel machine body a cabin which is internally provided with various operating instruments including a control steering wheel and a control seat (refer to Japanese Unexamined Patent Application Publication No. 2013-112104 and Japanese Patent No. 3657249). The cabin mounting type work vehicle is provided with a wiper for removing soil on a windshield for securing visibility of a control operator (refer to Japanese Patent No. 3657249).

In the meantime, in the structure in which the wiper is provided in the outer side of the windshield such as this kind of work vehicle, a wiper driving mechanism including a wiper motor driving the wiper is necessary, and there has been a problem that a support portion for the wiper motor can not be easily secured. Further, since the windshield has been conventionally structured such as to be separated into three sections, an assembling work such as a bonding work is complicated, and a forward visibility is inhibited by a blind corner caused by the bonded portion.

Further, in this kind of work vehicle, a plurality of switches such as a DPF regeneration switch, a working switch, and a one-touch automatic switch are provided concentrically in a front surface of a control seat. Therefore, there has been a problem that an operator can not easily view the switches because the switches are under screen of a control steering wheel or an operation lever. Further, in this kind of work vehicle, there is a work vehicle structured such as to be provided with a tilt lever and a telescopic lever for adjusting a posture of the control steering wheel in conformity to a driving posture of the operator. However, if the tilt lever or the telescopic lever is erroneously operated, there has been a problem that the posture of the control steering wheel comes to a posture which can not be expected by the operator.

SUMMARY OF THE INVENTION

A technical object of the present invention is to provide a tractor to which an improvement is applied as a result of making a study of the actual condition as mentioned above.

A work vehicle according to the present invention is a work vehicle structured such that a steering column is arranged in front of a control seat which is provided on a travel machine body, and a control steering wheel having an approximately round shape in a plan view is provided in an upper end side of a steering wheel shaft which protrudes upward out of an upper surface of the steering column, wherein the control steering wheel is constructed by spokes which are axially supported to the steering wheel shaft, and a steering wheel which is arranged in an outer side of the spokes, and a plurality of switches are arranged at positions which are on the upper surface of the steering column and correspond to an area surrounded by the spokes and the steering wheel in the control steering wheel at a straight traveling position.

In the work vehicle, a meter panel may be fixed to a dash board which is provided in a rising manner so as to bury the steering column, the spokes of the control steering wheel may be installed like a Y-shaped form, and the meter panel may be positioned between the spokes in the control steering wheel at the straight traveling position, thereby arranging the meter panel in a field of vision of an operator under a straight traveling work posture.

Further, the dash board may be structured by an inside board to which the meter panel is fixed, and an outside cover which is fixed so as to cover the inside board from an upper side, and the inside board may be provided with an opening portion in which a display surface of the meter panel is arranged, and a side wall which is obtained by upraising an outer peripheral portion of the opening portion, and may be formed into a shape in which an outer side of the display surface of the meter panel is formed by the side wall.

Further, a DPF regeneration switch, a working switch, and a one-touch automatic switch may be provided on the upper surface of the steering column, the DPF regeneration switch may be installed to an upper surface of one side of the steering column above a brake pedal, and the working switch and the one-touch automatic switch may be installed while having the spoke of the control steering wheel arranged on a center line in a back-and-forth direction of the travel machine body therebetween.

Further, the control steering wheel may be constructed by a steering wheel main body which is axially supported to the steering wheel shaft, a hub cover which covers an upper surface of a hub in a center portion of the steering wheel main body, and a cap which covers an upper surface of the hub cover, a first contact point of the switch may be provided in the cap, a second contact point of the switch may be provided in the hub cover, the first contact point may be electrically connected to a boss which is provided at a position of an axial center of the steering wheel main body and fitted to the steering wheel shaft, and the second contact point may be electrically connected to a slip ring which is provided in a lower surface of the hub in the steering wheel main body and insulated from the boss.

Further, in the work vehicle having a wiper which is provided in an outer side of a windshield, and a wiper driving mechanism which drives the wiper, the work vehicle may be structured such that an air-cut plate is provided in a front surface side of the steering column where the control steering wheel is arranged, and the wiper driving mechanism may be attached to the air-cut plate. According to the work vehicle, it is possible to improve an assembling workability of the wiper and the wiper driving mechanism in spite that the wiper driving mechanism can be compactly supported to an inner side of the meter display portion in an upper end portion of the air-cut plate.

Further, the wiper driving mechanism may be firmly fixed to a rear surface of the air-cut plate, the windshield may be provided in a tension manner in a front surface side of the air-cut plate, and a drive shaft of the wiper driving mechanism may be passed through the air-cut plate and the windshield. According to the structure, it is possible to omit a bonding work of the windshield, it is possible to simplify an assembling work of the windshield and it is possible to improve a design property in comparison with a structure in which the windshield is formed into three divisional parts.

Further, a sound insulation material may be provided in a tension manner by a sheet metal frame in a front surface of the windshield facing to the air-cut plate, in the front surface of the windshield, and the drive shaft of the wiper driving mechanism may be passed through the sound insulation material. According to the structure, it is possible to prevent engine noise from being transmitted to the air-cut plate (the cabin) side. It is possible to simplify a waterproof construction of a drive shaft attaching portion in the wiper driving mechanism.

Further, the above work vehicle may be constructed by a work vehicle having a tilt lever and a telescopic lever which adjust a posture of the control steering wheel, wherein the tilt lever and the telescopic lever are arranged in a sorting manner in right and left sides of a steering column where the control steering wheel is arranged. As a result, it is possible to reduce an erroneous operation of the tilt lever or the telescopic lever, and it is possible to easily prevent the posture of the control steering wheel from being changed to a posture which is not expected by the operator.

Further, the tilt lever is installed in the left side of the steering column, and the telescopic lever is installed in the right side of the steering column. As a result, the operator can grip the tilt lever by a left hand, and grip the control steering wheel by a right hand, and it is possible to improve a tilt adjustment operability of the control steering wheel having a higher frequency than a telescopic adjustment operation.

Further, the work vehicle may be structured such that the posture of the steering column is changed working with a posture adjustment of the control steering wheel. As a result, a support position of a display lamp or a switch which are arranged in the upper surface side of the steering column is adjusted its position working with the control steering wheel, and the display lamp or the switch can be supported in the field of vision of the seating operator.

According to the present invention, since the switches are arranged on the steering column in conformity to the shape of the control steering wheel, the switches can be easily discriminated by the seating operator and it is possible to prevent an erroneous operation during working or traveling. Further, since the arrangement position of the meter panel is set in conformity to the shape of the control steering wheel, the operator can not only easily obtain information about a state of the work vehicle while looking straight, but also appropriately select and operate the switches in conformity to the state of the work vehicle.

According to the present invention, since the display surface of the meter panel can be arranged at a position which is far back from a most back surface of the dash board, it is possible to prevent reflection to a side door constructed by a glass in the case that the control seat is arranged within the cabin. As a result, the reflection is not generated on the basis of the light generation of the display surface of the meter panel, it is possible to prevent the operator's field of vision from being disturbed at the traveling time or the working time, and it is possible to comfortably operate.

According to the present invention, the DPF regeneration switch does not get behind the control steering wheel or the operation lever, and the position of the DPF regeneration switch and the lighting display state can be easily viewed by the seating operator. Further, it is possible to be easily viewed the positions of the working switch and the one-touch automatic switch by the seating operator, and it is possible to reduce the erroneous operation.

According to the present invention, the switches can be easily assembled in the control steering wheel which is a rotating part, and it is possible to improve a workability when the assembling work or the maintenance work of the control steering wheel is carried out. Since a warning motion can be operated by a horn in the control steering wheel by setting the switch to a horn switch, it is possible to improve an operability of the operator.

BRIEF DESCRIPTION OF THE DRAWINGS

FIG. 20 is a view showing a telescopic motion of a control steering wheel;

DESCRIPTION OF THE EMBODIMENTS

Figure 1:
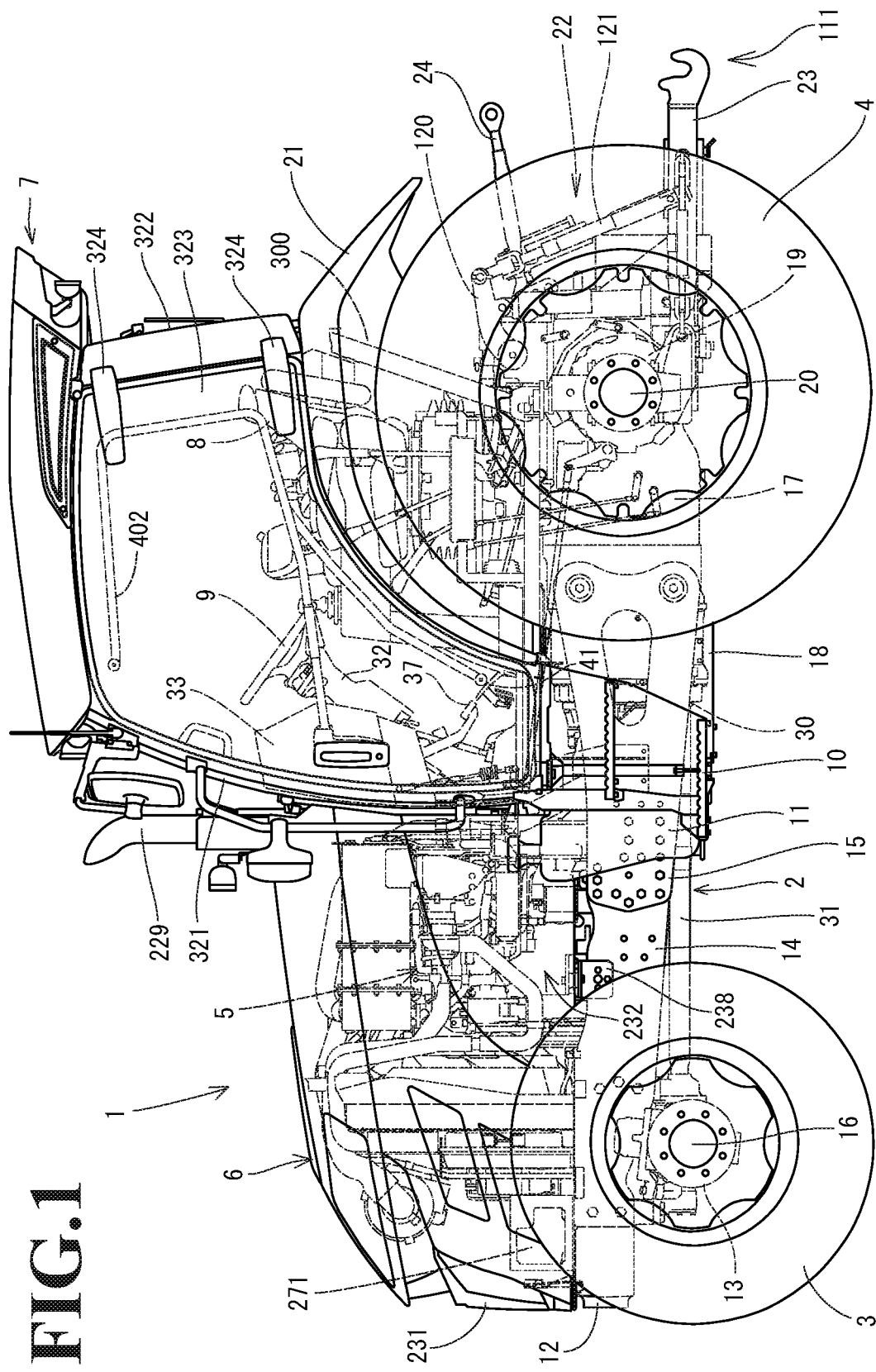
FIG. 1 is a left side elevational view of a tractor.

A description will be given below of an embodiment obtained by specifying the present invention on the basis of the accompanying drawings of a tractor for an agricultural work. As shown in FIGS. 1 to 8, a travel machine body 2 of a tractor 1 is supported by a pair of right and left front wheels 3 serving as a traveling portion and a pair of right and left rear wheels 4 serving as the traveling portion in the same manner. The pair of right and left rear wheels 4 correspond to a rear traveling portion. A diesel engine 5 (hereinafter, refer simply to as an engine) is mounted to a front portion of the travel machine body 2, and the tractor 1 is structured such as to travel forward and backward by driving the rear wheels 4 or the front wheels 3 by the engine 5. The engine 5 is covered with a hood 6. A cabin 7 is installed to an upper surface of the travel machine body 2. A control seat 8 and a control steering wheel 9 operating the front wheels 3 to steer are arranged in an inner portion of the cabin 7. Right and left outer sides of the cabin 7 are provided with steps 10 by which an operator gets on and off. A fuel tank 11 feeding fuel to the engine 5 is provided in a lower side of a bottom portion of the cabin 7.

The travel machine body 2 is constructed by an engine frame 14 which has a front bumper 12 and a front axle case 13, and right and left machine body frames 15 which are detachably fixed to a rear portion of the engine frame 14. Front axles 16 are rotatably protruded outward from both right and left end sides of the front axle case 13. The front wheels 3 are attached to both right and left end sides of the front axle case 13 via the front axles 16. A transmission case 17 for appropriately changing rotary power from the engine 5 and transmitting the rotary power to four front and rear wheels 3, 3, 4, and 4 is coupled to a rear portion of the machine body frame 15. A tank frame 18 is fastened by bolts to a lower surface side of the right and left machine body frames 15 and the transmission case 17, the tank frame 18 protruding outward to right and left and being formed into a rectangular frame plate in a bottom elevational view. The fuel tank 11 in the embodiment is separated into two right and left sections. The right and left tanks 11 are mounted in a sorting manner to upper surface sides of the right and left protruding portions of the tank frame 18. Right and left rear axle cases 19 are installed to right and left outer side surfaces of the transmission case 17 so as to protrude outward. Right and left rear axles 20 are inward inserted to the right and left rear axle cases 19 rotatably. The rear wheels 4 are attached to the transmission case 17 via the rear axles 20. The above of the right and left rear wheels 4 is covered with right and left rear fenders 21.

A hydraulic elevating mechanism 22 moving up and down a ground working machine (not shown), for example, a rotary tiller is detachably attached to a rear portion of the transmission case 17. The ground working machine is coupled to the rear portion of the transmission case 17 via a three-point link mechanism 111 which is constructed by right and left lower links 23 and a top link 24. A PTO shaft 25 for transmitting PTO driving force to the ground working machine such as the rotary tiller is provided in a rear side surface of the transmission case 17 so as to be protruded rearward.

Figure 13:
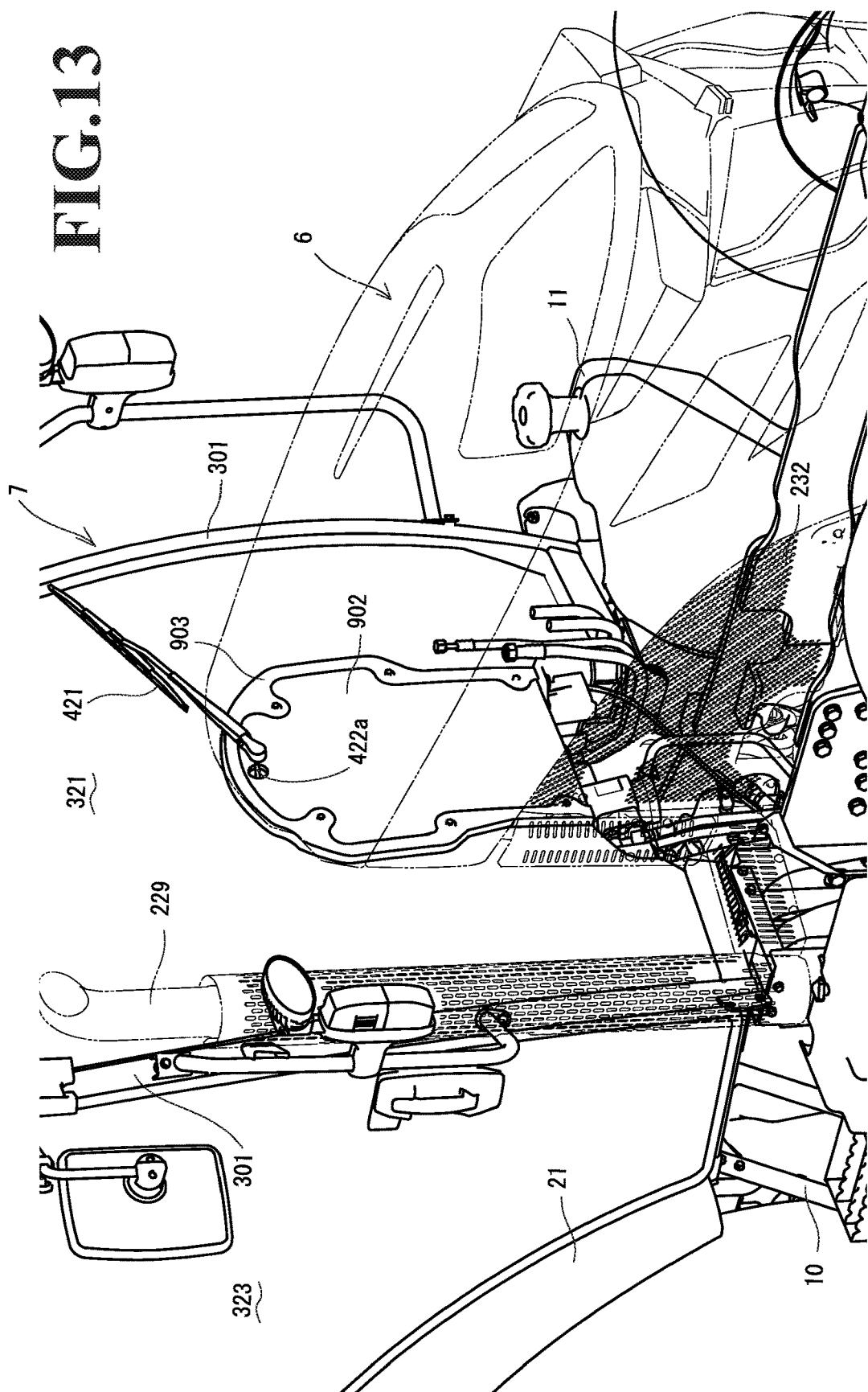
FIG. 13 is a perspective view showing a structure of a front side of a cabin.

A flywheel 26 (refer to FIGS. 4 to 6, 10, and 11) is coupled to an output shaft (a piston rod) of the engine 5, the output shaft protruding rearward from a rear side surface of the engine 5. A main driving shaft 27 and a main transmission input shaft 28 are coupled via a power transmission shaft 29 having universal shaft joints in both ends, the main driving shaft 27 protruding outward from the flywheel 26, and the main transmission input shaft 28 protruding forward from a front surface side of the transmission case 17 (refer to FIGS. 4 to 6). As shown in FIG. 13, in an inner portion of the transmission case 17, there are arranged a hydraulic continuously variable transmission 500, a forward and backward movement switching mechanism 501, travel transmission gear mechanisms 502, 503, and 504, and a different gear mechanism 506 for the rear wheels. The rotary power of the engine 5 is transmitted to the main transmission input shaft 28 of the transmission case 17 via the main driving shaft 27 and the power transmission shaft 29, and is changed by the hydraulic continuously variable transmission 500 and the travel transmission gear mechanism, and the transmission power is transmitted to the right and left rear wheels 4 via the differential gear mechanism 506 for the rear wheels.

A front wheel transmission shaft 508 is coupled via a drive shaft 31 for the front wheels to a front wheel output shaft 30 which protrudes forward out of a lower portion in a front surface of the transmission case 17, the front wheel transmission shaft 508 protruding rearward out of the front axle case 13 which has a differential gear mechanism 507 for the front wheels built-in. The transmission power generated by a hydraulic continuously variable transmission 500 and a travel transmission gear mechanism (a two-wheel/four-wheel drive switching mechanism 504) within the transmission case 17 is structured such as to be transmitted to the right and left front wheels 3 via the differential gear mechanism 507 for the front wheels within the front axle case 13 from the front wheel output shaft 30, the front wheel drive shaft 31, and the front wheel transmission shaft 508.

Next, a description will be given of a structure of an inner portion of the cabin 7 with reference to FIGS. 3, 7 and 8. A steering column 32 is arranged in a front direction of the control seat 8 within the cabin 7. The steering column 32 is provided in a rising manner in a back surface side of a dash board 33 which is arranged in a front surface side in the inner portion of the cabin 7. A control steering wheel 9 formed into an approximately round shape in a plan view is attached to an upper end side of a steering wheel shaft which protrudes upward out of an upper surface of the steering column 32.

Figure 14:
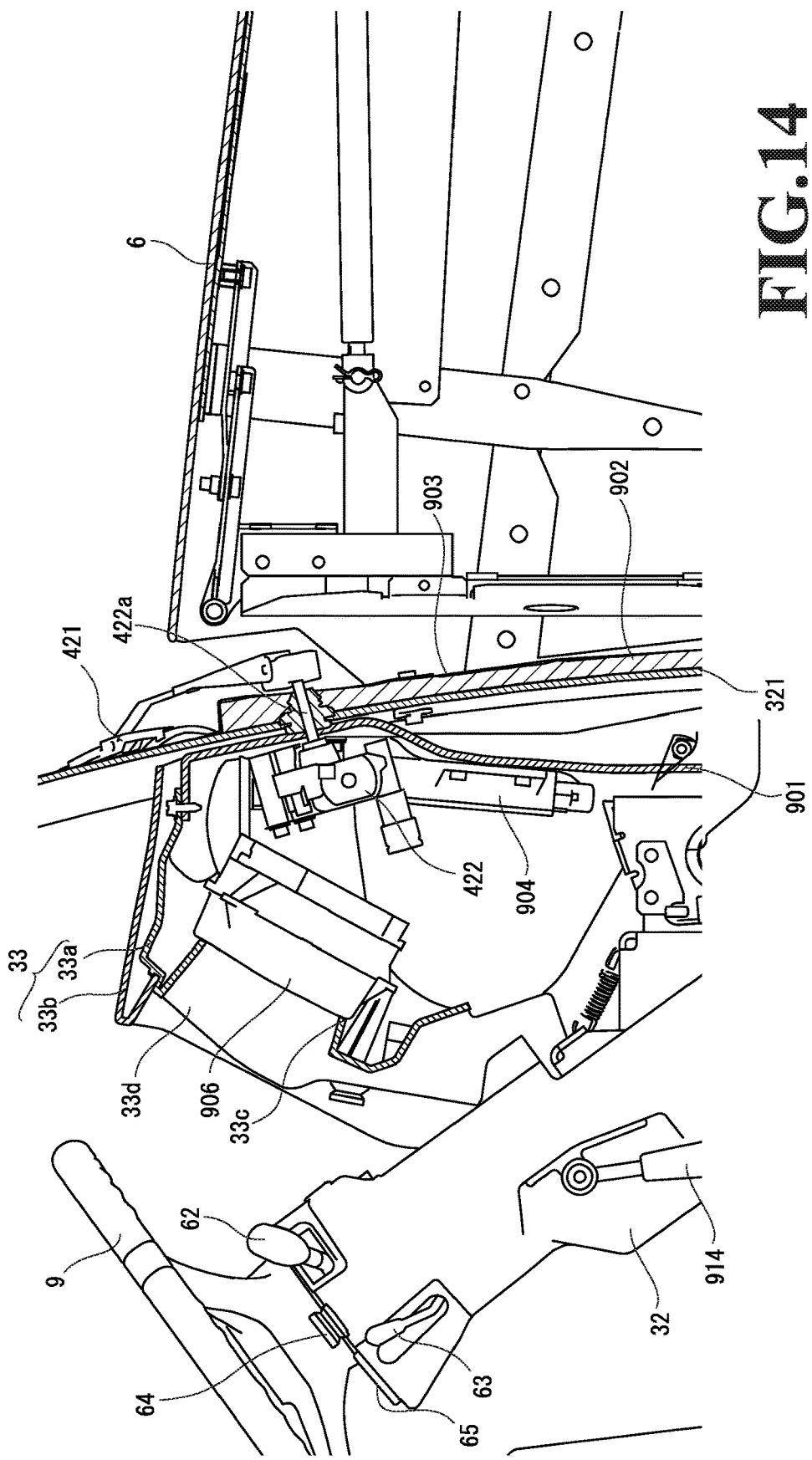
FIG. 14 is a cross sectional view showing a structure of an internal portion of a dash board.
Figure 15:
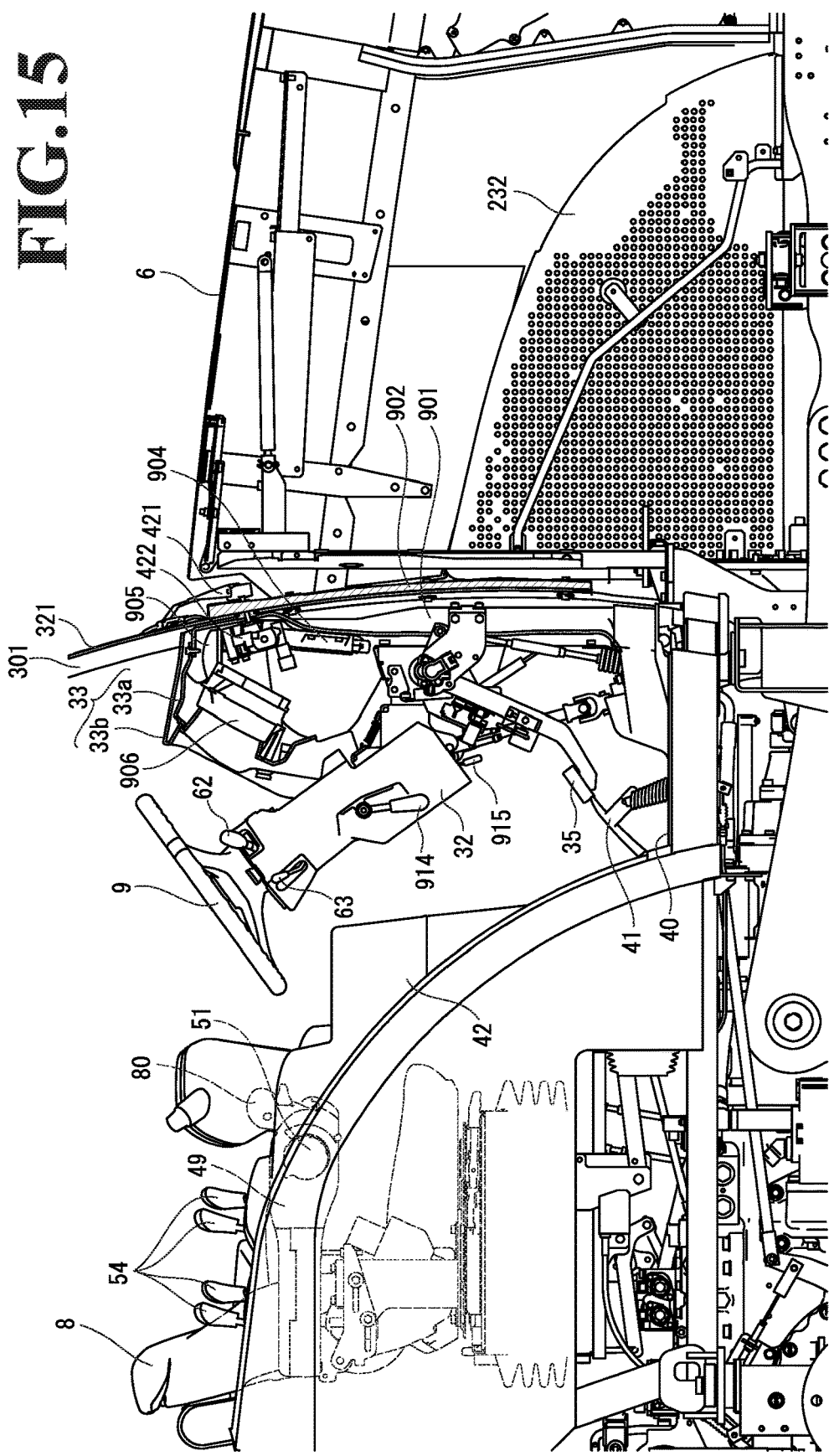
FIG. 15 is an enlarged cross sectional view showing the structure of the internal portion of the dash board.
Figure 16:
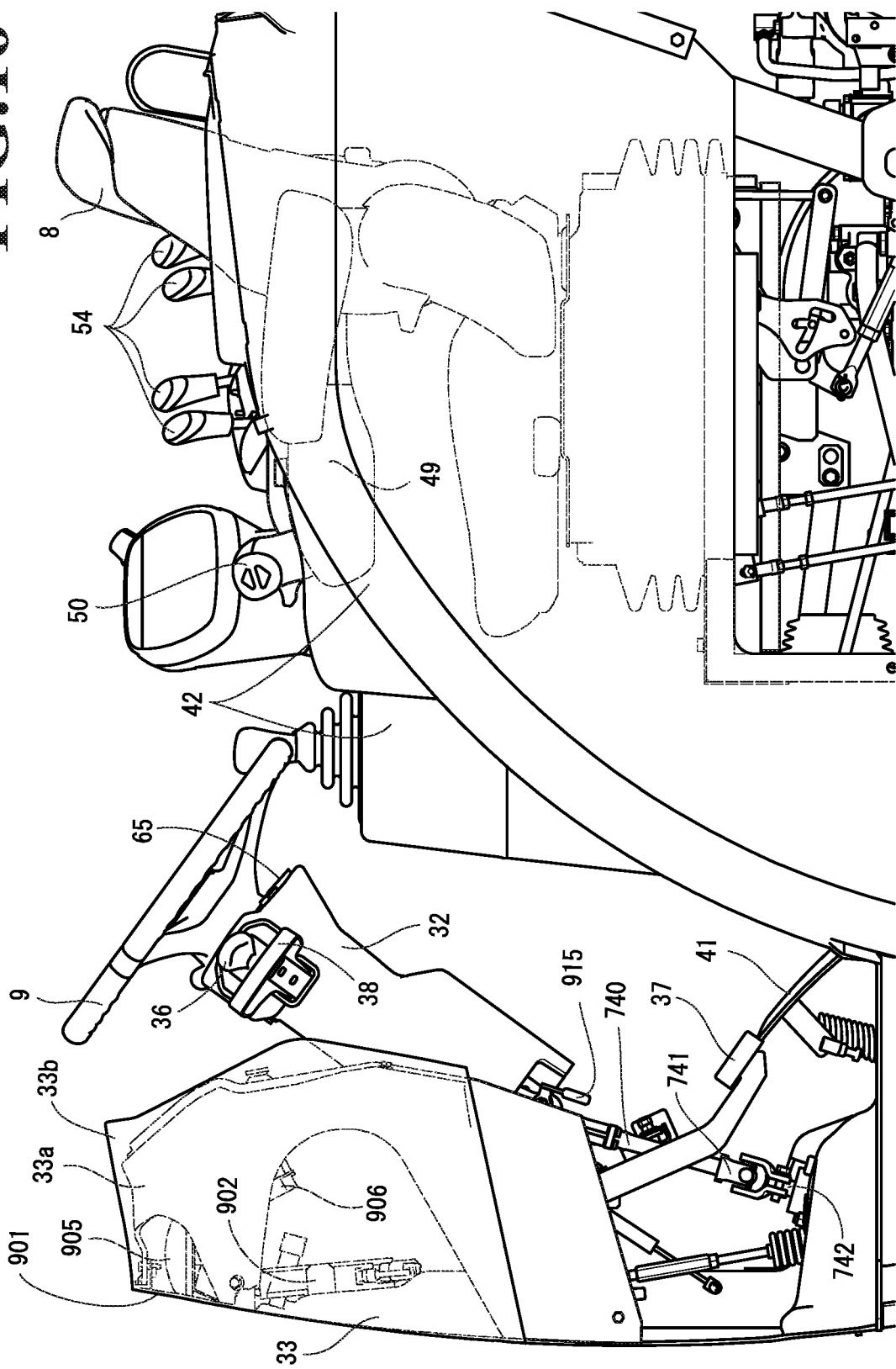
FIG. 16 is a left side elevational view showing a structure of an internal portion of the cabin.
Figure 17:
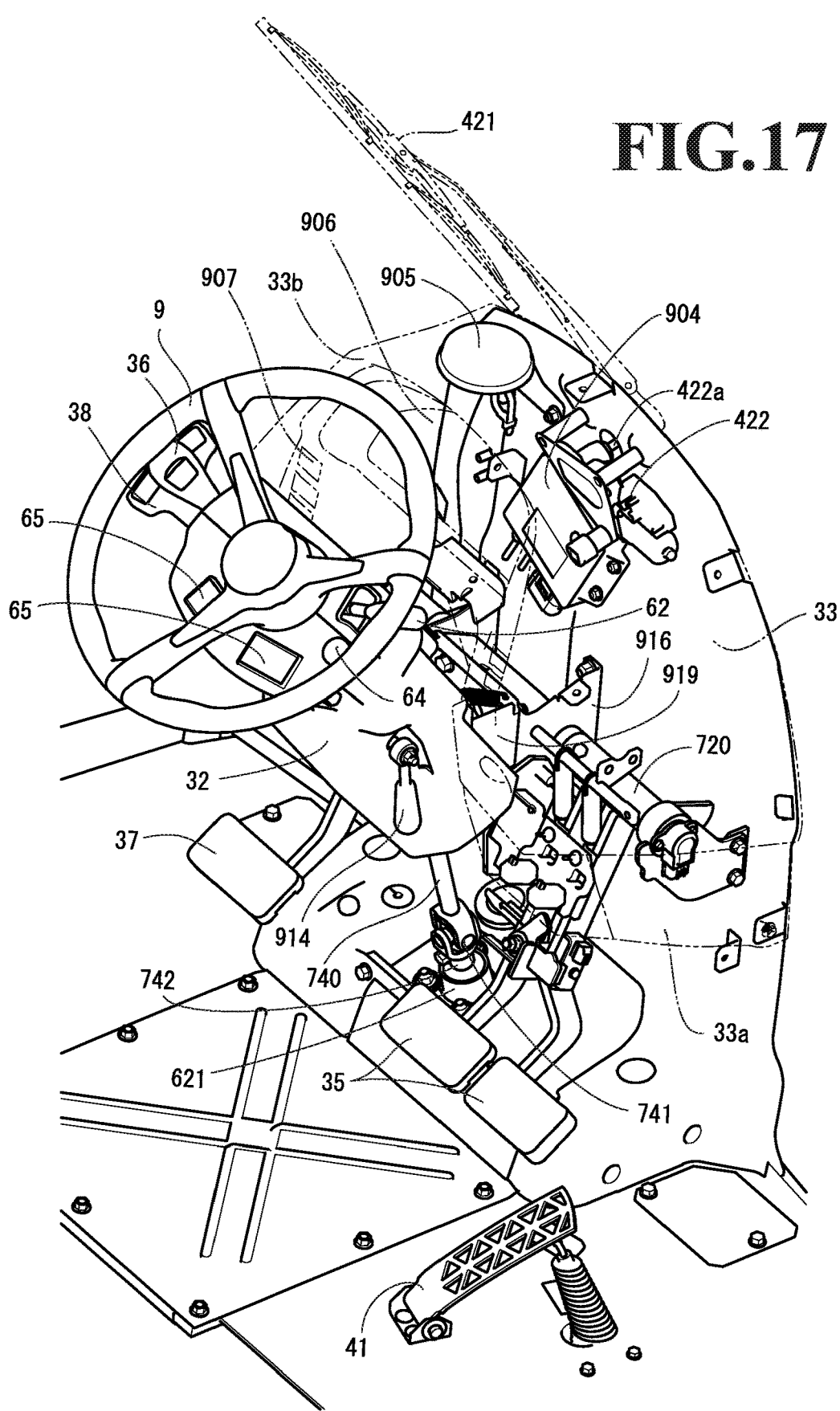
FIG. 17 is a perspective view showing the structure of the internal portion of the dash board.
Figure 18:
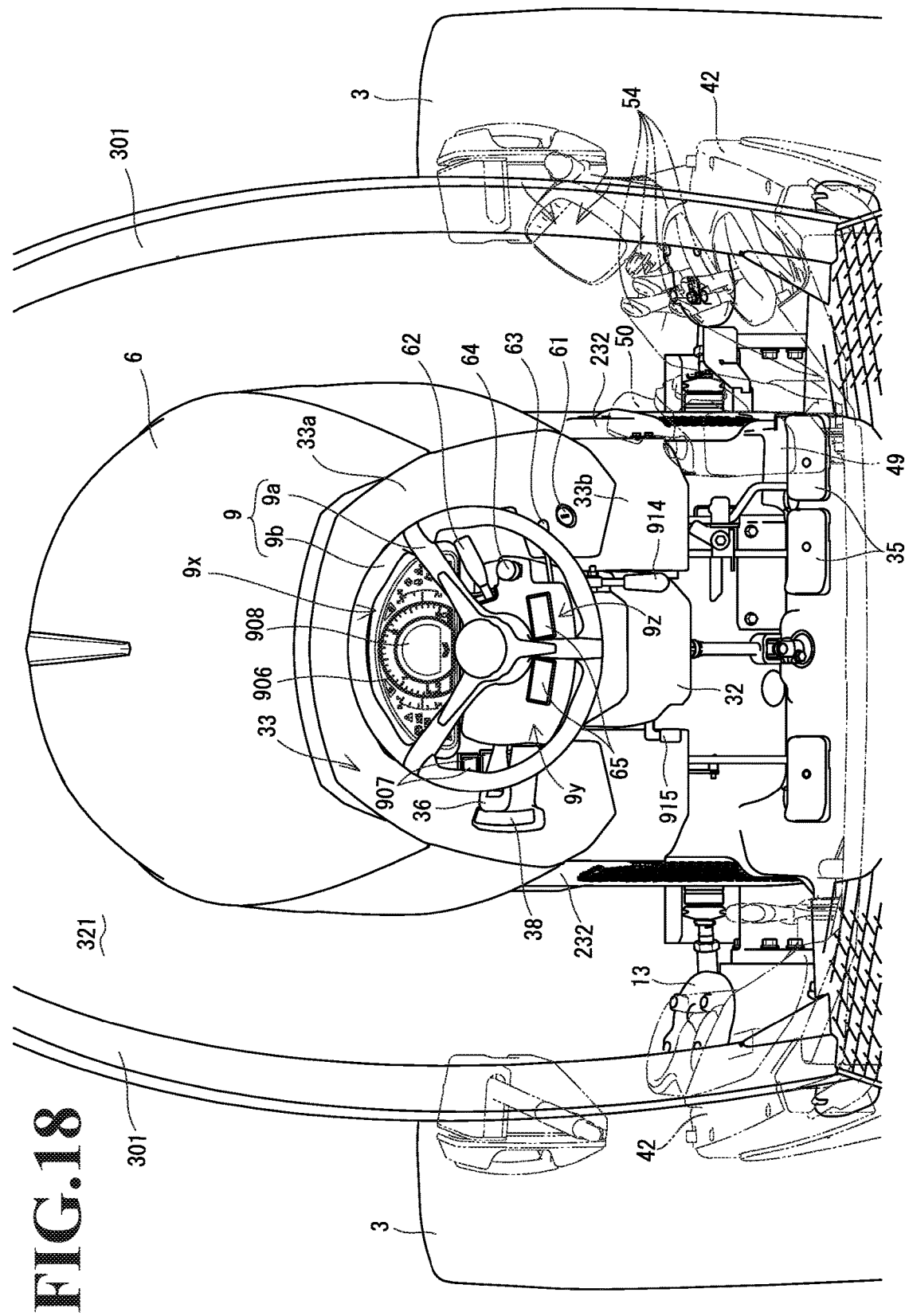
FIG. 18 is a view in the case of viewing a forward direction from a control seat.
Figure 19:
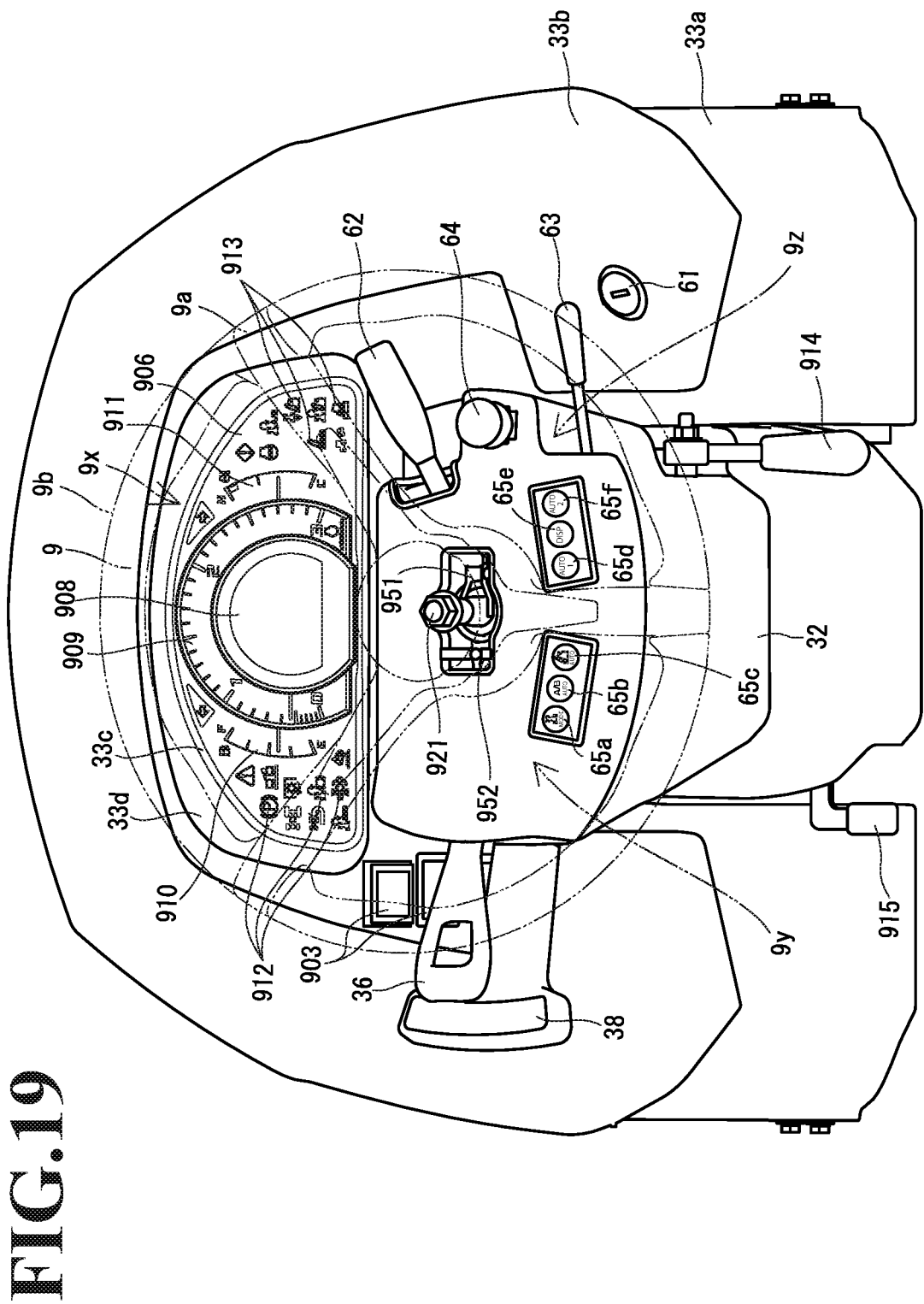
FIG. 19 is a front elevational view of a meter panel as seen from the control seat.

A pair of right and left brake pedals 35 for braking the travel machine body 2 are arranged in a downward side in a right side of the steering column 32. A forward and backward movement switching lever 36 (a reverser lever) is arranged in an upward side in a left side of the steering column 32, the forward and backward movement switching lever 36 being provided for operating to switch a moving direction of the travel machine body 2 to a forward movement and a backward movement. A clutch pedal 37 is arranged in a downward side in a left side of the steering column 32, the clutch pedal 37 being provided for operating to shut off an output of the hydraulic continuously variable transmission 500 (a forward movement low-speed hydraulic clutch 537, a forward movement high-speed hydraulic clutch 539, and a backward movement hydraulic clutch 541). A master control electromagnetic valve 635 is turned on by a stepping operation of the clutch pedal 37, and the forward movement output or the backward movement output of the hydraulic continuously variable transmission 500 is disconnected (refer to FIG. 14).

An erroneous operation prevention body 38 (a reverser guard) extending along the forward and backward movement switching lever 36 is arranged below the forward and backward movement switching lever 36 in the left side of the steering column 32. The operator is prevented from carelessly coming into contact with the forward and backward movement switching lever 36 when the operator gets on and off the tractor 1, by protruding the erroneous operation prevention body 38 corresponding to a contact prevention tool outward more than the forward and backward movement switching lever 36. An operation indicator panel 39 having a liquid crystal panel built-in is provided in an upper portion side on a back surface of the dash board 33.

An accelerator pedal 41 controlling a rotational speed of the engine 5 or a vehicle speed is arranged in a right side of the steering column 32 in a floor panel 40 in a front direction of the control seat 8 within the cabin 7. An approximately whole of an upper surface of the floor panel 40 is formed into a flat surface. Right and left side columns 42 are arranged in both right and left sides while having the control seat 8 therebetween. Between the control seat 8 and the left side column 42, there are arranged a parking brake lever 43 which maintains the right and left rear wheels 4 in a braked state, an ultra-low speed lever 44 (a creep work lever) which widely lowers the forward movement traveling speed (the vehicle speed) of the tractor 1 forcibly, a sub transmission lever 45 which switches an output range of a travel sub transmission gear mechanism 503 within the transmission case 17, and a PTO shift lever 46 which operates to switch a driving speed of the PTO shaft 25. A differential lock pedal 47 for turning on and off a differential drive of the right and left rear wheels 4 is arranged below the control seat 8. An inverse rotation PTO lever 48 executing an operation for inversely driving the PTO shaft 25 is arranged in a left side at the back of the control seat 8 (refer to FIG. 10).

An arm rest 49 for putting an arm or an elbow of the operator seating on the control seat 8 is provided between the control seat 8 and the right side column 42. The arm rest 49 is provided with a main transmission lever 50 which accelerates and decelerates the traveling speed of the tractor 1, and a dial-type work portion position dial 51 (an elevation dial) which manually changes and adjusts a height position of the ground working machine such as the rotary tiller. The arm rest 49 is structured such as to be jumped up and rotatable in a plurality of stages around a lower portion in a rear end.

In the right side column 42, there are arranged a throttle lever 52 which sets and retains the rotational speed of the engine 5, a PTO clutch switch 53 which operates to connect and disconnect the power transmission to the working machine such as the rotary tiller from the PTO shaft 25, and a plurality of hydraulic operation levers 54 (SCV levers) for operating to switch a hydraulic external extraction valve 430 (refer to FIG. 14) which is arranged in an upper surface side of the transmission case 17, in this order from a front side. Here, the hydraulic external extraction valve 430 is provided for feeding and controlling an operating oil to a hydraulic device of the working machine such as the front loader which is later attached to the tractor 1. In the embodiment, four hydraulic operation levers 54 are arranged in conformity to the number (four) of the hydraulic external extraction valves.

Figure 4:
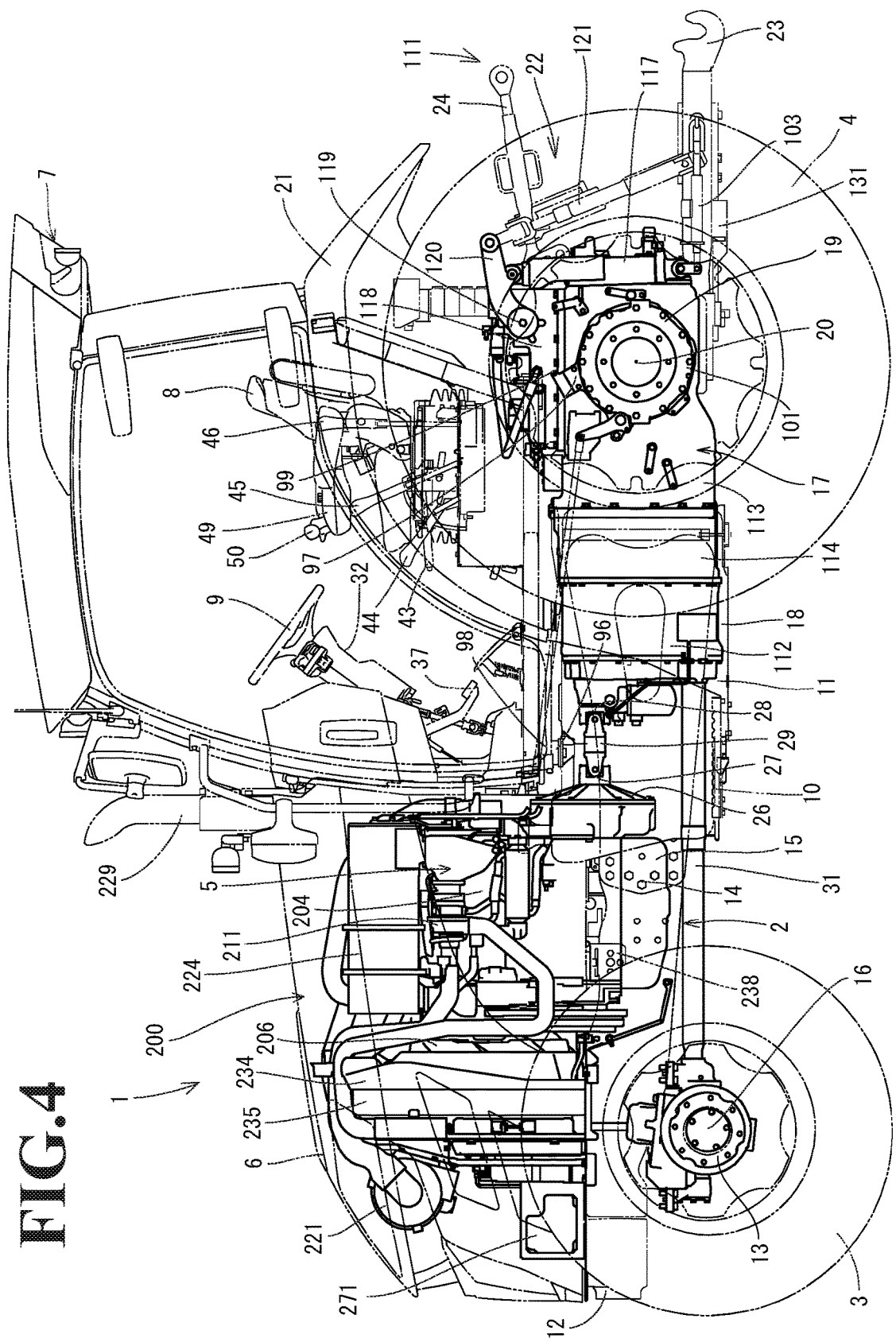
FIG. 4 is an explanatory view of a left side surface of a travel machine body.
Figure 5:
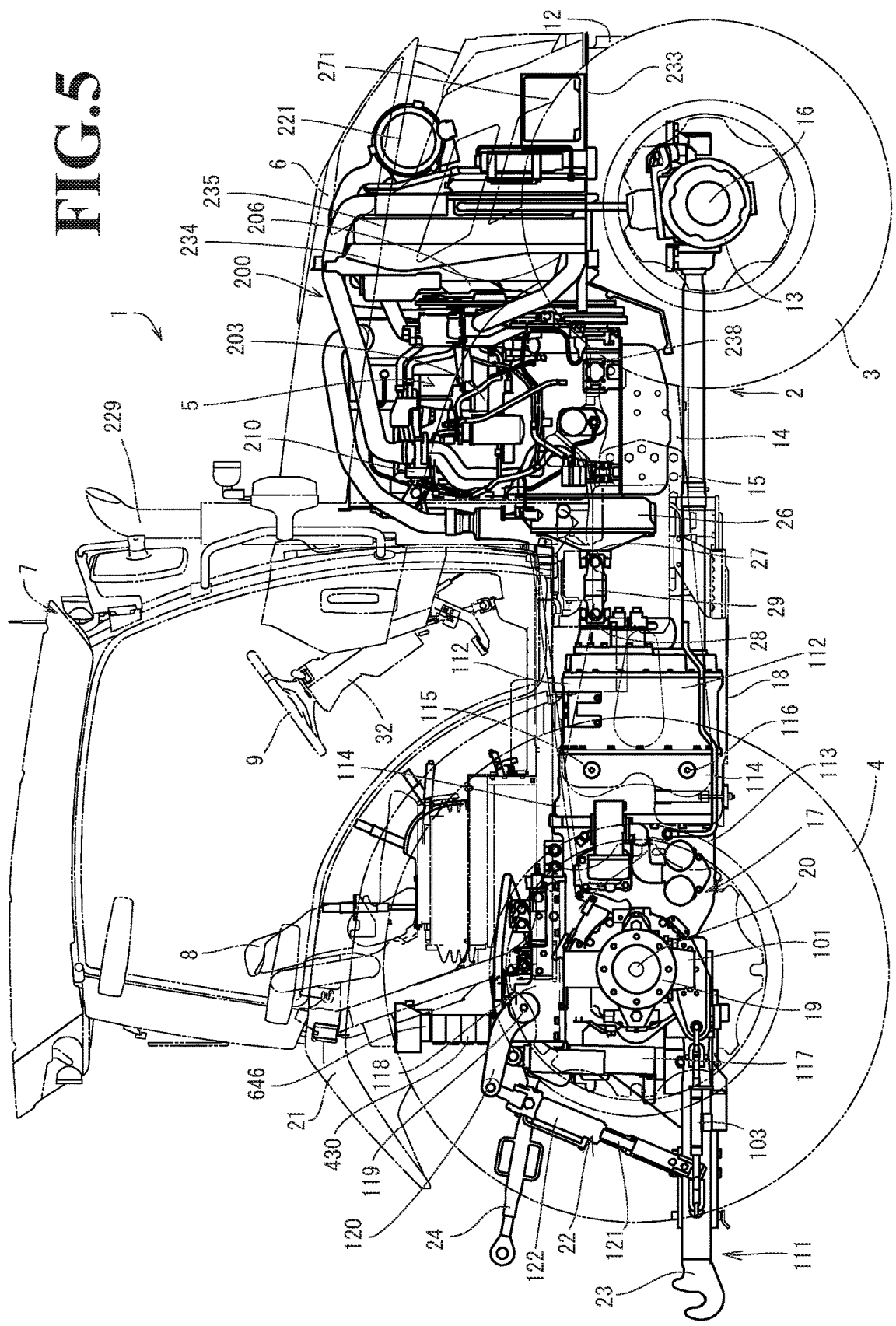
FIG. 5 is an explanatory view of a right side surface of the travel machine body.
Figure 6:
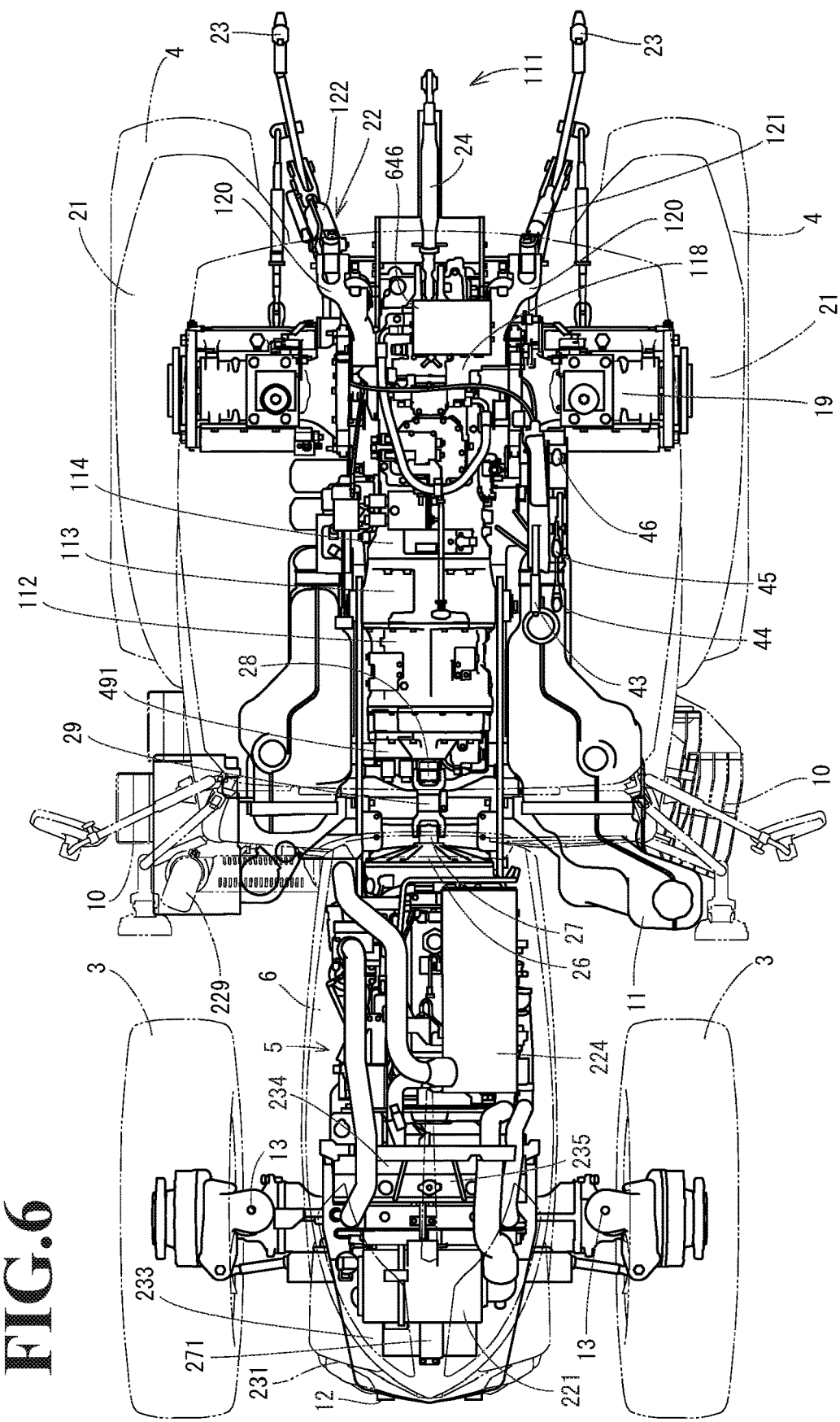
FIG. 6 is a plan view of the travel machine body.

Further, as shown in FIGS. 9 to 12, there are provided right and left front portion support tables 96 which support a front side of the cabin 7, and right and left rear portion support tables 97 which support a rear portion of the cabin 7. The front portion support tables 96 are fastened by bolts to a longitudinally intermediate portion in the external side surfaces of the right and left machine body frames 15, and a bottom portion in the front side of the cabin 7 is supported in a vibration proofing manner to upper surface sides of the front portion support tables 96 via a vibration proofing rubber body 98. Further, the rear portion support tables 97 are fastened by bolts to an intermediate portion of a lateral width in the upper surfaces of the right and left rear axle cases 19 which are extended horizontally in a lateral direction, and a bottom portion in the rear side of the cabin 7 is supported in a vibration proofing manner to the upper surface sides of the rear portion support tables 97 via a vibration proofing rubber body 99. More specifically, the diesel engine 5 and the cabin 7 are supported in a vibration proofing manner to the travel machine body 2 (the engine frame 14, the machine body frame 15, and the rear axle case 19 which are integrally coupled) via a plurality of vibration proofing rubber bodies. Further, as shown in FIGS. 4 and 5, the rear portion support tables 97 are arranged in the upper surface side of the rear axle case 19, a swing prevention bracket 101 is arranged in the lower surface side of the rear axle case 19, and the rear portion support table 97 and the swing prevention bracket 101 are fastened by bolts. Further, both end portions of a swing prevention rod body 103 with a turn buckle which is adjustable in a telescopic motion are coupled to an intermediate portion of the lower link 23 extended in a longitudinal direction and the swing prevention bracket 101. As a result, the swing motion of the lower link 23 in the lateral direction is prevented.

Next, a description will be given of the diesel engine 5 below the hood 6 and an engine room structure with reference to FIGS. 4 to 8. The diesel engine 5 is structured such that a cylinder head is mounted onto a cylinder block which has an engine output shaft and a piston built-in, and an intake air manifold 203 and an EGR device 210 are arranged in a right side surface of the diesel engine 5 (the cylinder head), the intake air manifold 203 being connected to an air cleaner 221 via a turbo supercharger 211, and the EGR device 210 recirculating a part of exhaust gas from an exhaust gas manifold 204. The diesel engine 5 is structured such that a part of the exhaust gas discharged to the exhaust gas manifold 204 flows back to the intake air manifold 203, whereby the highest combustion temperature at the high load operation is lowered, and a discharge amount of NOx (nitrogen oxide) from the diesel engine 5 is reduced. Meanwhile, the exhaust gas manifold 204 connected to a tail pipe 229, and the turbo supercharger 211 are arranged in a left side surface of the diesel engine 5 (the cylinder head). More specifically, the intake air manifold 203 and the exhaust gas manifold 204 are arranged in a sorting manner in the right and left side surfaces along the engine output shaft in the engine 5. A cooling fan 206 is arranged in a front surface side of the diesel engine 5 (the cylinder block).

In addition, as shown in FIGS. 4 to 8, the diesel engine 5 is provided with a continuous regeneration type exhaust gas purification device 224 (DPF) which is arranged in the upper surface side of the diesel engine 5 (above the exhaust gas manifold 204), and connects the tail pipe 229 to the exhaust gas side of the exhaust gas purification device 224. Particulate matter (PM) in the exhaust gas discharged out of the machine via the tail pipe 229 from the engine 5 is removed by the exhaust gas purification device 224, and carbon oxide (CO) and hydro carbon (HC) in the exhaust gas are reduced.

Figure 2:
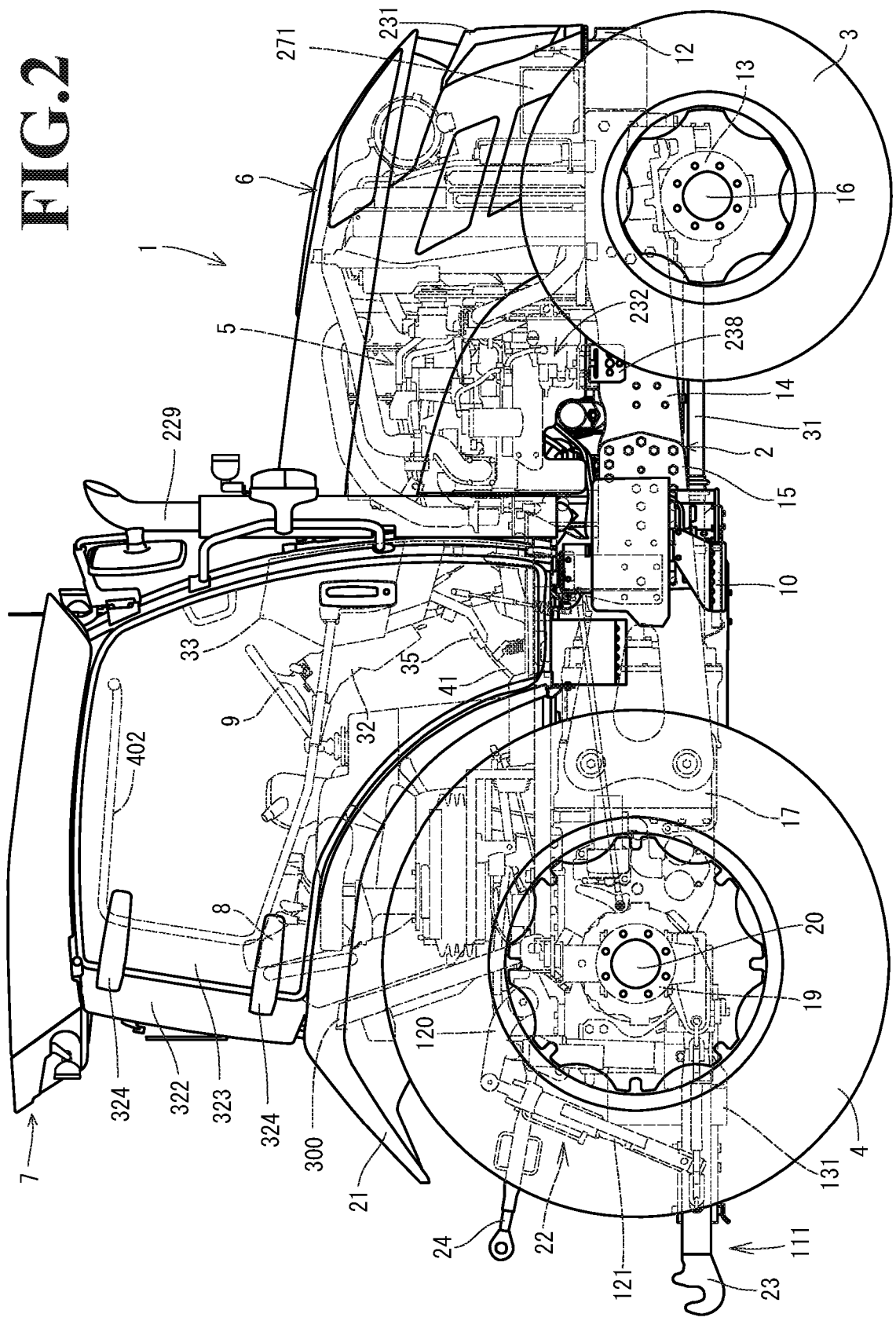
FIG. 2 is a right side elevational view of the tractor.
Figure 3:
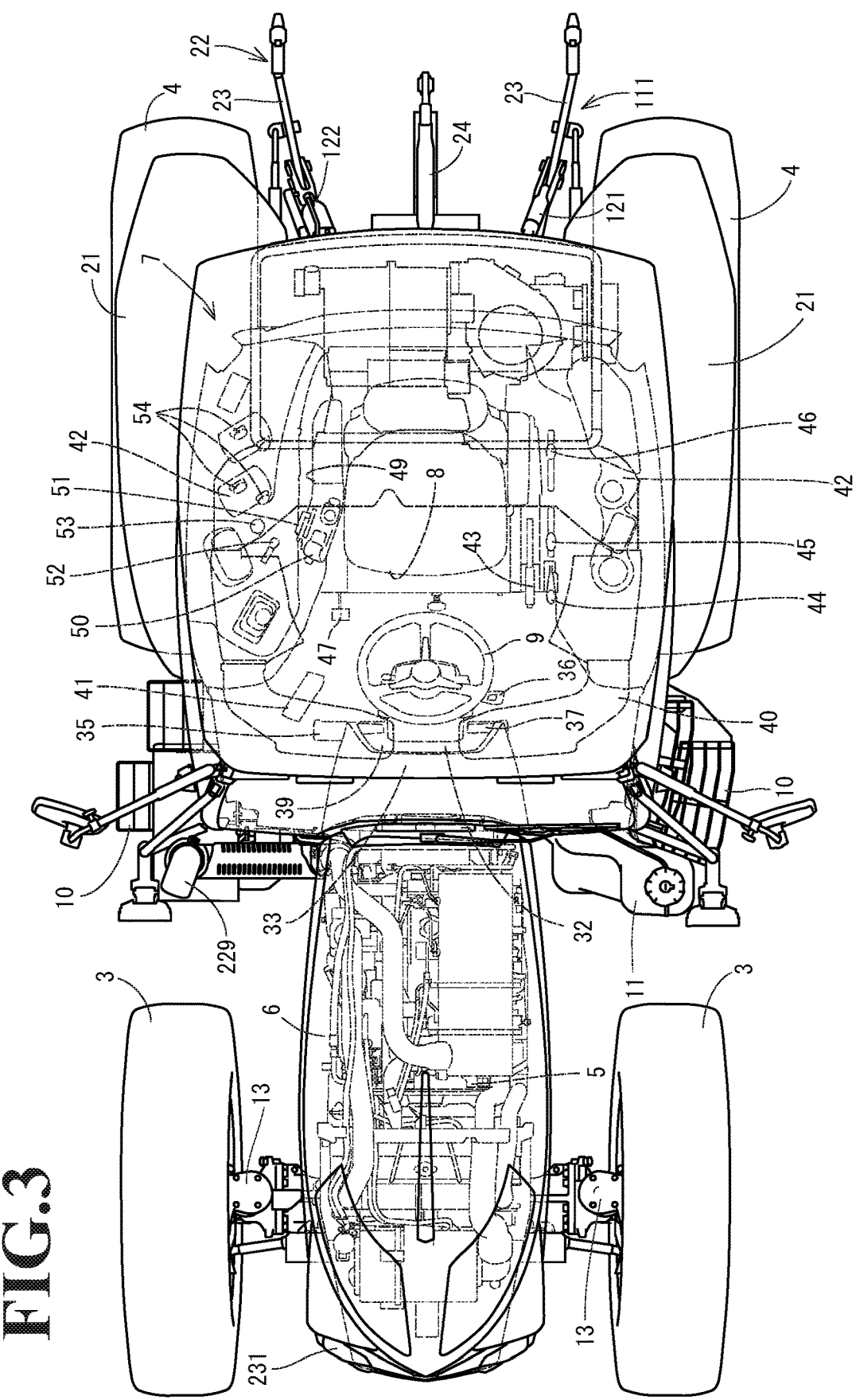
FIG. 3 is a plan view of the tractor.

Further, as shown in FIGS. 1 to 3, the hood 6 has a front grill 231 in a lower side of its front portion, and covers an upper surface side and a front surface side of the engine room 200. A side portion engine cover 232 formed by a porous plate is arranged in right and left lower sides of the hood 6, and covers the right and left lateral sides of the engine room 200. More specifically, the front side, the upper side, and the right and left sides of the diesel engine 5 are covered with the hood 6 and the engine cover 232.

Further, as shown in FIGS. 4 to 8, a radiator 235 having a fan shroud 234 attached to a back surface side thereof is provided in a rising manner on an engine frame 14 so as to be positioned in a front surface side of the engine 5. The fan shroud 234 surrounds an outer peripheral side of a cooling fan 206 and communicates the radiator 235 with the cooling fan 206. An air cleaner 221 is arranged at a position above a front surface of the radiator 235. An oil cooler and a fuel cooler are installed in the front surface side of the radiator 235 in addition to the inter cooler mentioned above. Further, an engine control unit (an engine ECU) 271 is arranged at a front position of a heat exchanger such as the radiator 235. The engine ECU 271 receives a sensor signal from each of the sensors in the engine 5, and controls driving of the engine 5. The engine control unit 271 is provided in a rising manner in a frame bottom plate 233 so as to make a longitudinal direction of the engine control unit 271 be along a longitudinal direction of the travel machine body 2 (a longitudinal direction of the engine frame 14).

Meanwhile, as shown in FIGS. 9 to 12, a pair of right and left machine body frames 15 are coupled by a supporting beam frame 236. The supporting beam frame 236 is fastened by bolts to each of the right and left machine body frames 15, is installed to front end portions of the right and left machine body frames 15 (a rear surface side of the engine 5), and couples a rear portion of the diesel engine 5 to an upper surface of the supporting beam frame 236 via a rear portion engine leg body 237 having a vibration proofing rubber body. As shown in FIGS. 1, 2, 4, 5, 11, and 12, right and left side surfaces in the front portion of the diesel engine 5 are coupled to midstream portions of a pair of right and left engine frames 14 via right and left front portion engine leg bodies 238 having vibration proofing rubber bodies. More specifically, the front side of the diesel engine 5 is supported in a vibration proofing manner to the engine frame 14, and the rear portion of the diesel engine 5 is supported in a vibration proofing manner to the front end sides of a pair of right and left machine body frames 15 via the supporting beam frame 236.

Next, a description will be given of an attaching structure of the transmission case 17, the hydraulic elevating mechanism 22, and the three-point link mechanism 111, with reference to FIGS. 4 to 12. The transmission case 17 is provided with a front portion transmission case 112 having the main transmission input shaft 28, a rear portion transmission case 113 having the rear axle case 19, and an intermediate case 114 coupling a front side of the rear portion transmission case 113 to a rear side of the front portion transmission case 112. The rear end portions of the right and left machine body frames 15 are coupled to the right and left side surfaces of the intermediate case 114 via upper and lower machine body connection shaft bodies 115 and 116 in right and left sides. More specifically, the rear end portions of the right and left machine body frames 15 are coupled to both right and left side surfaces of the intermediate case 114 by two upper machine body connection shaft bodies 115 and two lower machine body connection shaft bodies 116, the machine body frame 15 and the transmission case 17 are integrally connected, and the rear portion of the travel machine body 2 is constructed. Further, the front portion transmission case 112 is structured such as to be protected by arranging the front portion transmission case 112 or the power transmission shaft 29 between the right and left machine body frames 15. The right and left rear axle cases 19 are attached to both the right and left sides of the rear portion transmission case 113 so as to protrude outward. In the embodiment, the intermediate case 114 and the rear portion transmission case 113 are made of cast iron having a high rigidity, and the front portion transmission case 112 is made of aluminum die casting having a light weight and a good workability.

According to the above structure, the transmission case 17 is constructed by being separated into three elements including the front portion transmission case 112, the intermediate case 114, and the rear portion case 113. As a result, three elements including the front portion transmission case 112, the intermediate case 114, and the rear portion transmission case 113 can be assembled after parts such as shafts and gears are previously assembled in each of the cases 112 to 114. Therefore, it is possible to accurately and efficiently assemble the transmission case 17.

Further, the right and left rear axle cases 19 are attached to both right and left sides of the rear portion transmission case 113, and the intermediate case 114 connecting the front portion transmission case 112 and the rear portion transmission case 113 and having the high rigidity structure is coupled to the right and left machine body frames 15 constructing the travel machine body 2. As a result, it is possible to execute a maintenance work or a repairing work of the shaft or the gear in the inner portion of the front portion transmission case 112 which is inward provided with the hydraulic continuously variable transmission (not shown), by detaching only the front portion transmission case 112, for example, in a state in which the intermediate case 114 and the rear portion transmission case 113 are attached to the machine body frame 15. Therefore, it is possible to make the frequency of a disassembling work for detaching a whole of the transmission case 17 from the tractor 1 significantly low, and it is possible to achieve improvement of the workability at the maintaining time or the repairing time.

Further, the intermediate case 114 and the rear portion transmission case 113 are made of the cast iron and the front portion transmission case 112 is made of the aluminum die casting. As a result, the intermediate case 114 and the rear portion transmission case 113 can be constructed as a strength member having a high rigidity, the intermediate case 114 being coupled to the machine body frame 15, and the rear portion transmission case 113 to which the right and left rear axle cases 19 are coupled. In addition, it is possible to save weight of the front portion transmission case 112 which is not the strength member. Therefore, it is possible to achieve weight saving of a whole of the transmission case 17 while sufficiently securing the rigidity of the travel machine body 2.

Meanwhile, as shown in FIGS. 4 to 12, the hydraulic elevating mechanism 22 has right and left hydraulic lift cylinders 117 which are controlled their actuations by an operation of a working portion position dial 51, right and left lift arms 120 which are rotatably pivoted in their base end sides to an upper surface lid body 118 via a lift supporting point shaft 119, the upper surface lid body 118 being provided in an upper surface side of the rear portion transmission case 113 in the transmission case 17 and being openable and closable, and right and left lift rods 121 which couple the right and left lift arms 120 to the right and left lower links 23. A part of the right lift rod 121 is formed by a horizontal cylinder 122 for controlling hydraulic pressure, and a length of the right lift rod 121 is structured such as to be adjustable in a telescopic motion by the horizontal cylinder 122.

Figure 7:
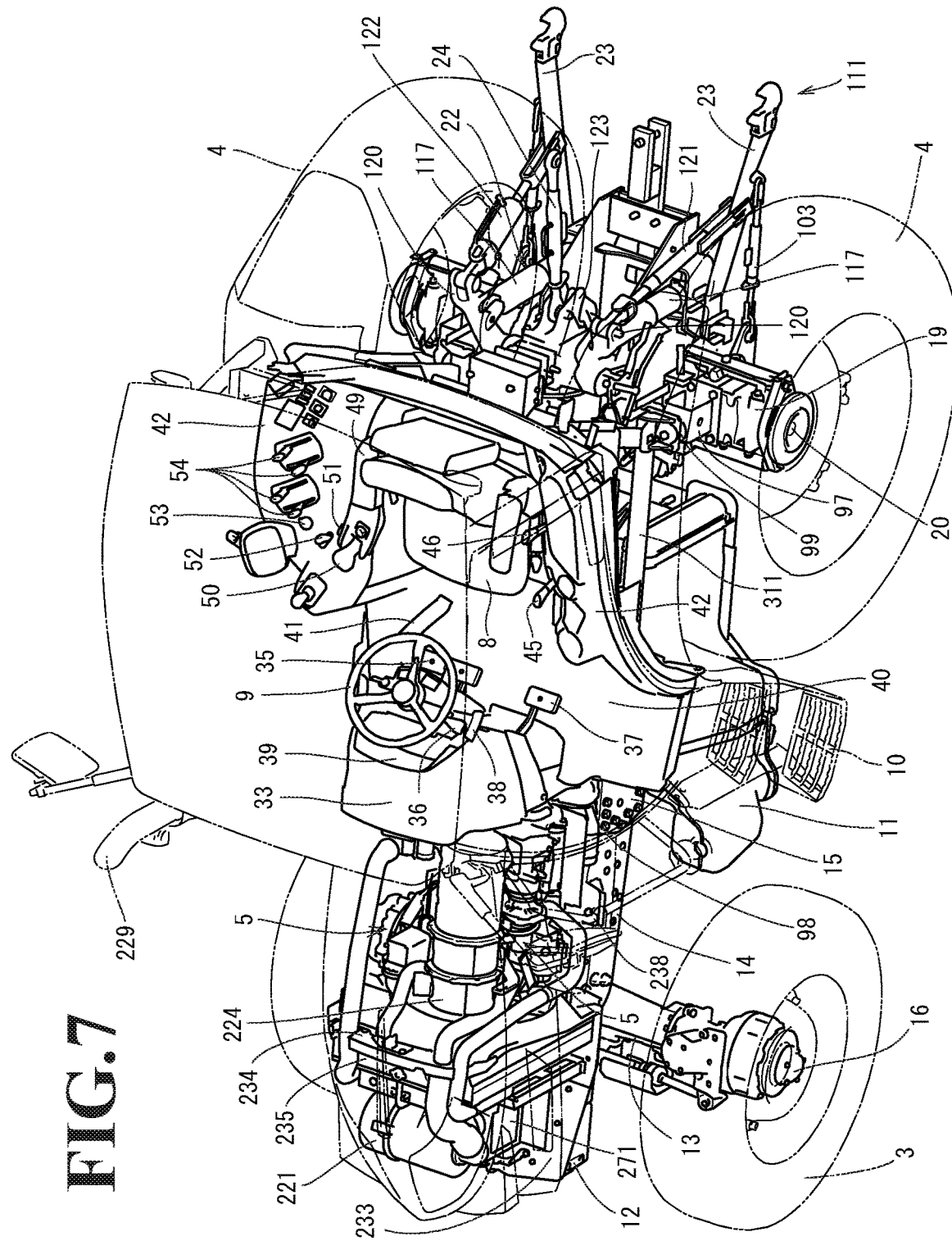
FIG. 7 is a perspective view of the travel machine body as seen from a back direction in a left side.
Figure 8:
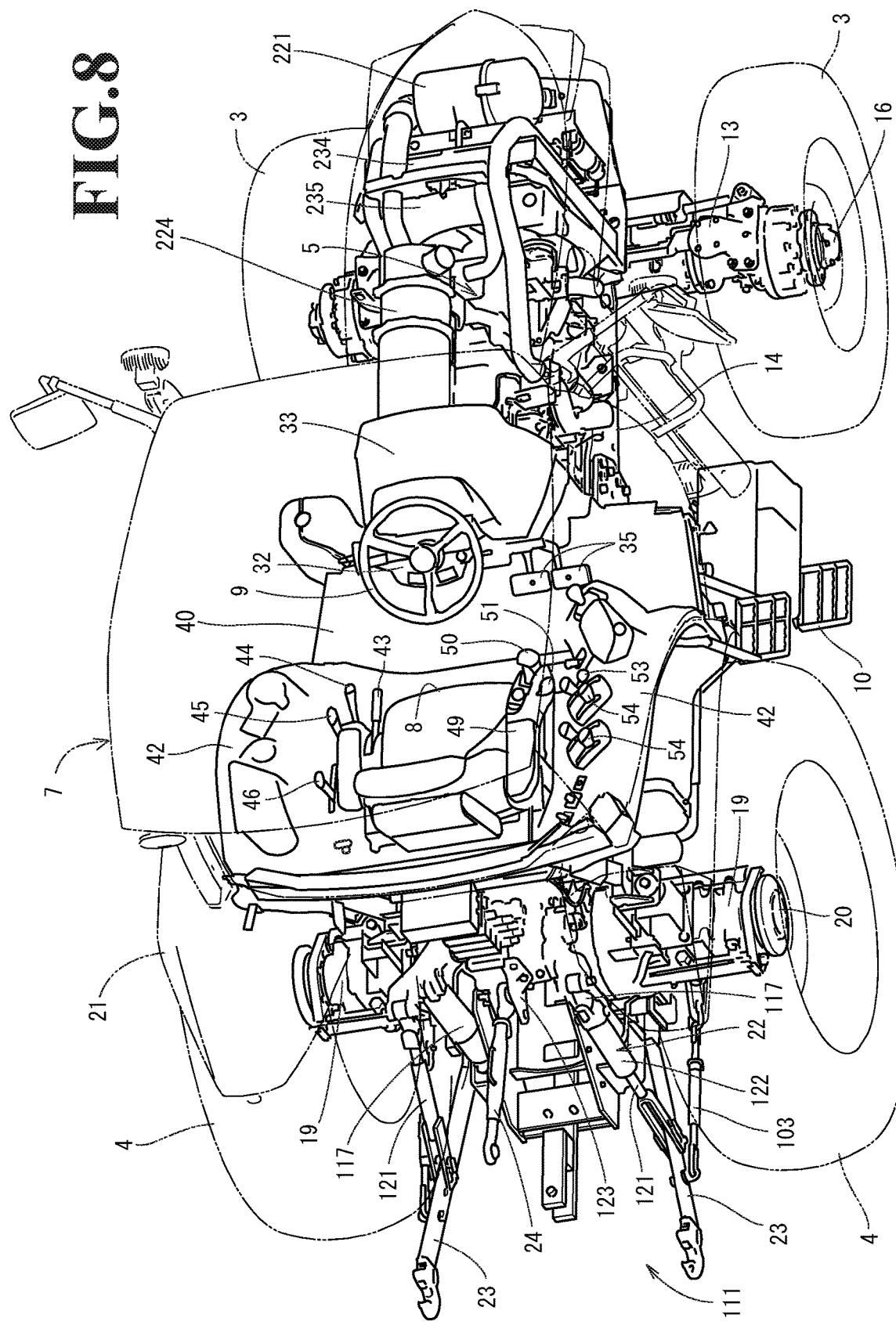
FIG. 8 is a perspective view of the travel machine body as seen from a back direction in a right side.
Figure 9:
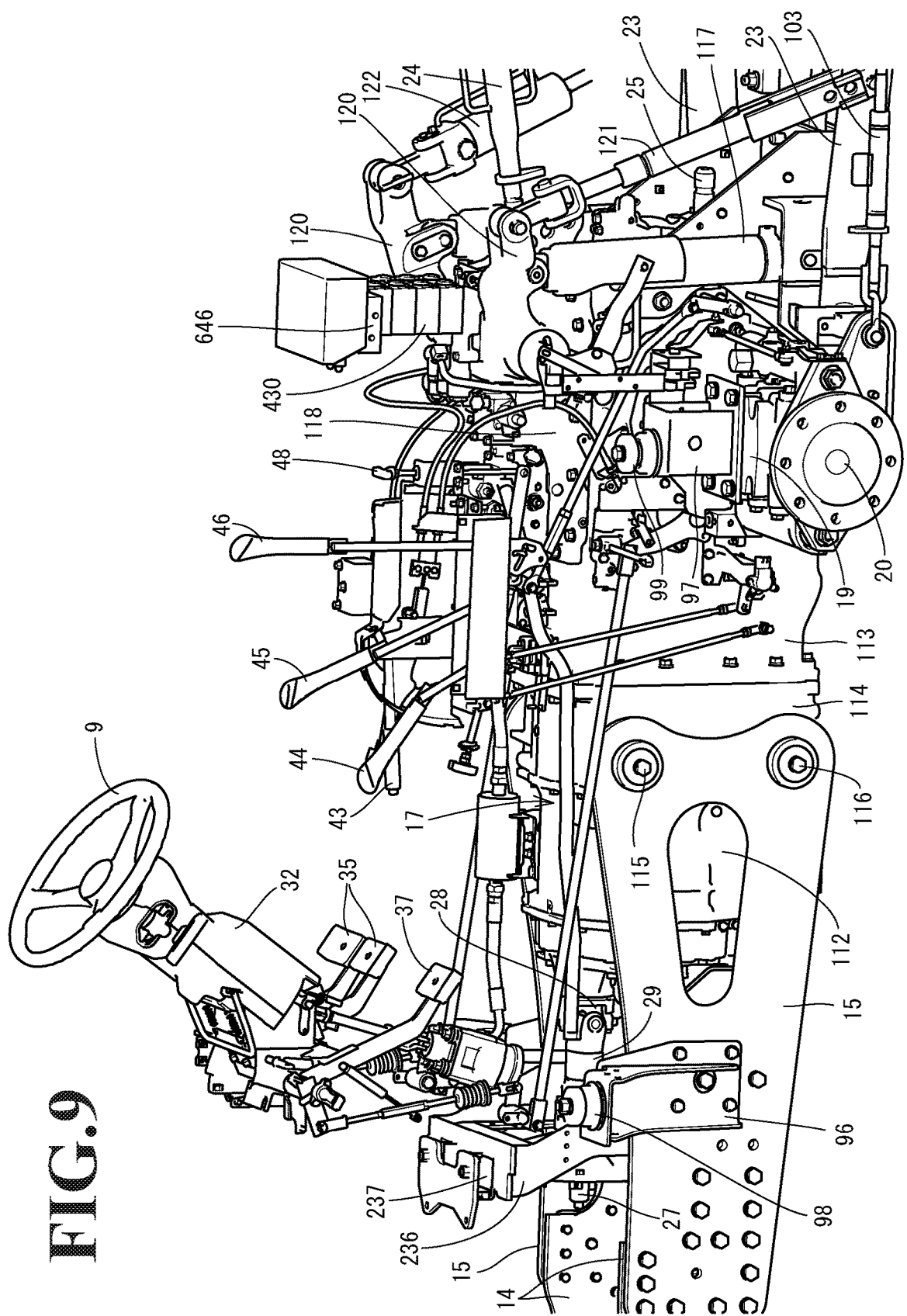
FIG. 9 is an enlarged perspective view of the travel machine body as seen from a lateral direction in a left side.
Figure 10:
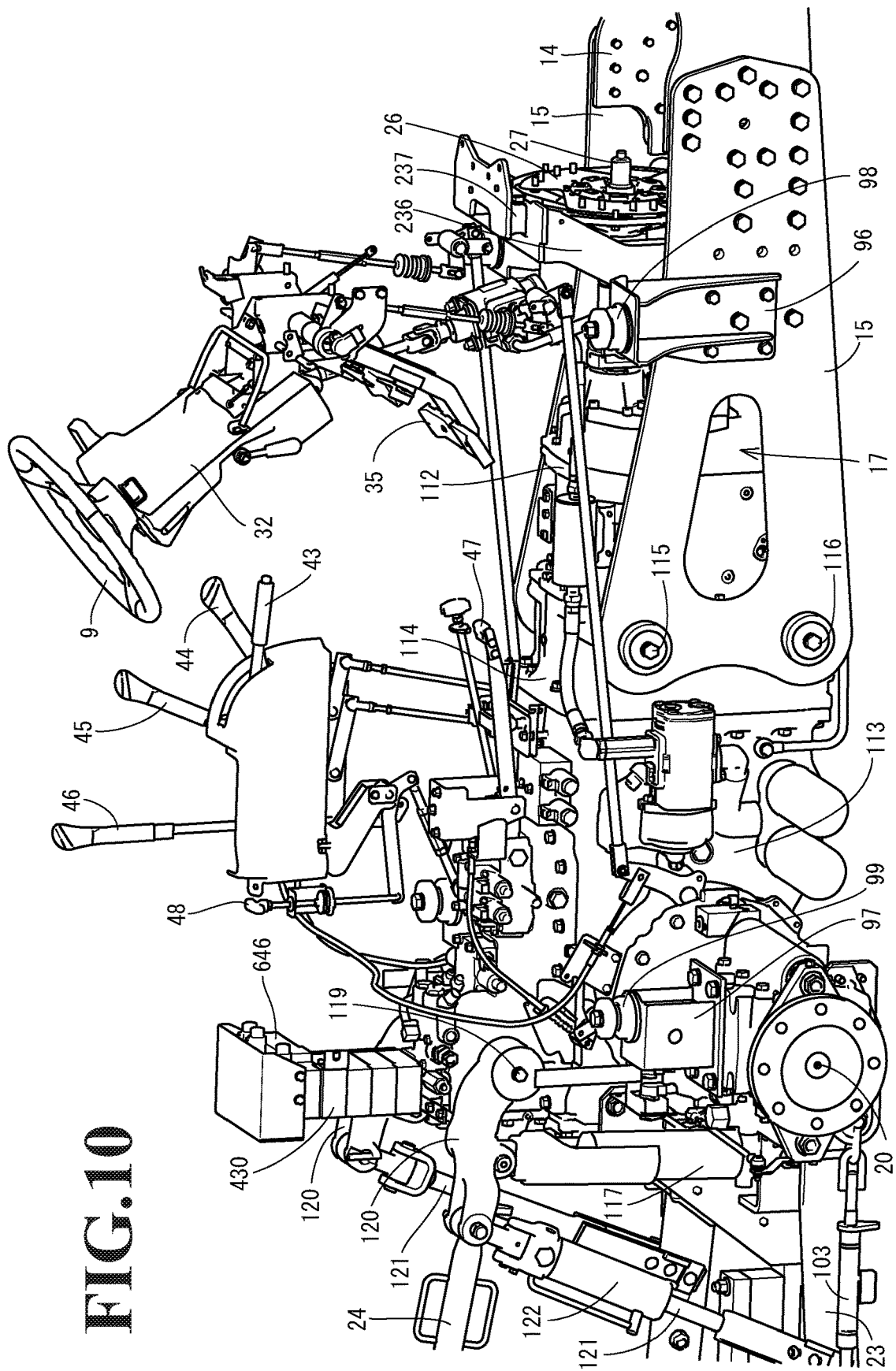
FIG. 10 is an enlarged perspective view of the travel machine body as seen from a lateral direction in a right side.
Figure 11:
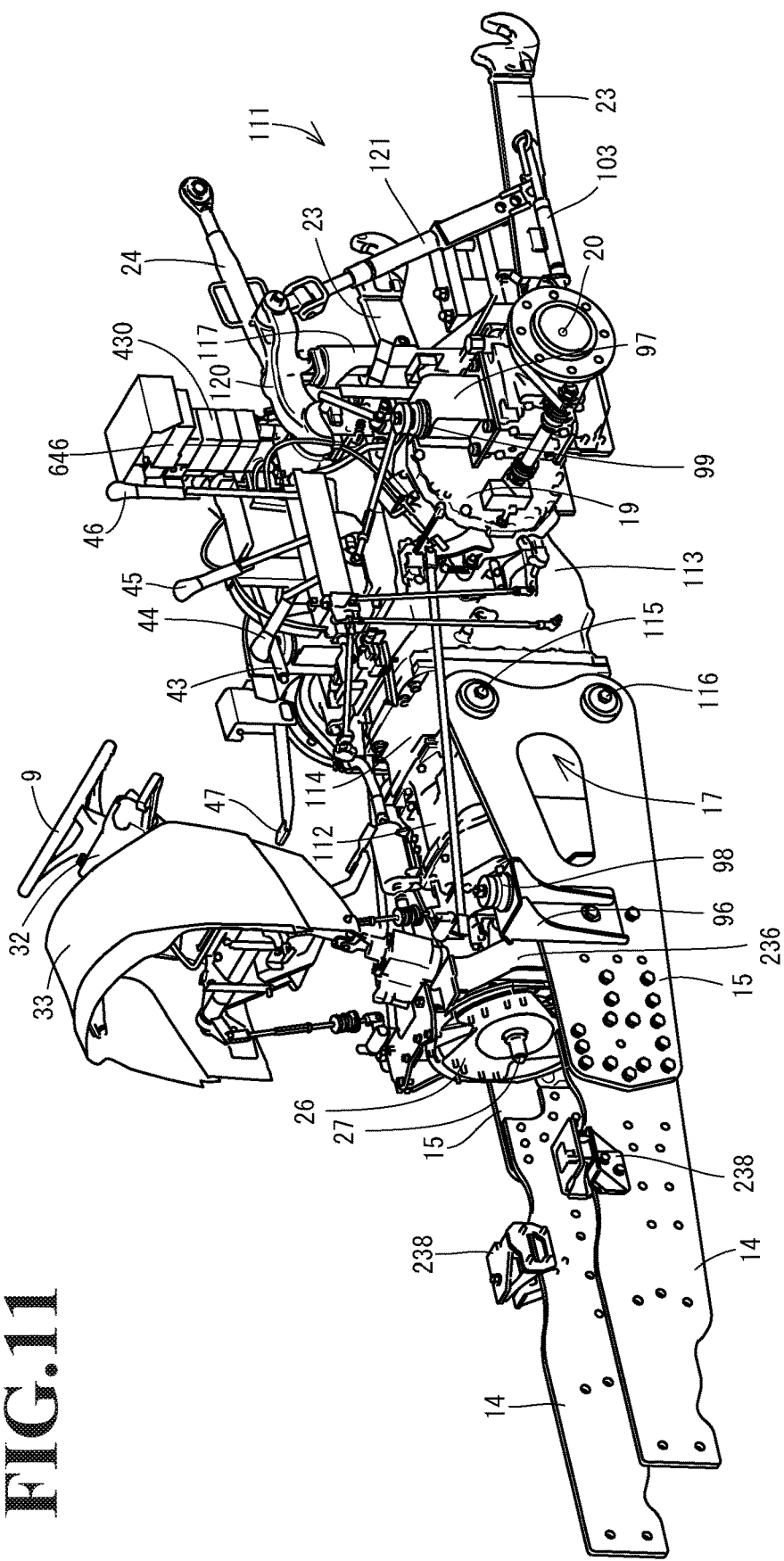
FIG. 11 is a perspective view of the travel machine body as seen from a front direction in a left side.
Figure 12:
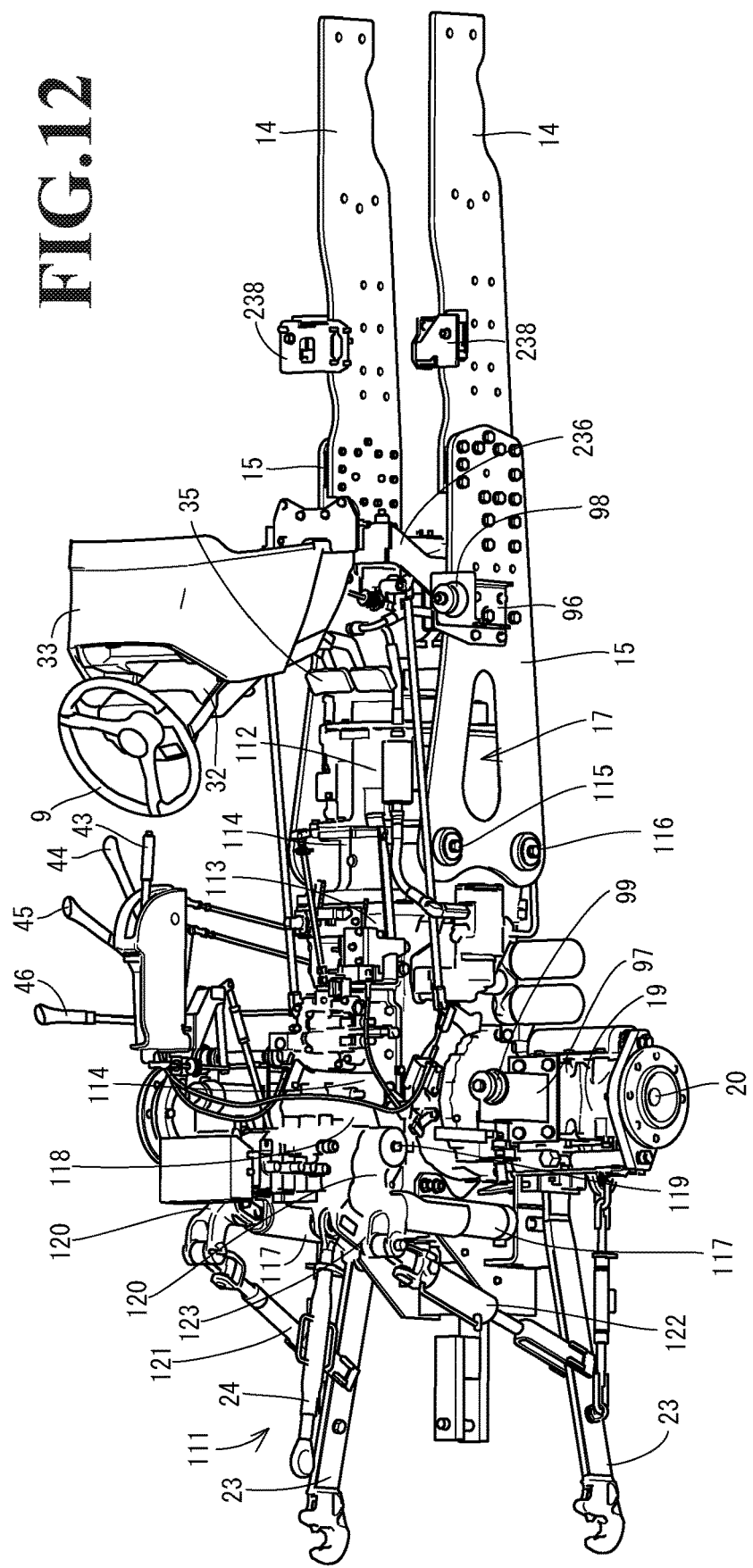
FIG. 12 is a perspective view of the travel machine body as seen from a lateral direction in a right side.

As shown in FIGS. 7, 8, and 10, a top link hinge 123 is firmly fixed to a back surface side of the upper surface lid body 118, and the top link 24 is coupled to the top link hinge 123 via a hinge pin. In the case that the length of the right lift rod 121 is changed by extending or contracting the piston of the horizontal cylinder 122 under a state in which the ground working machine is supported to the top link 24 and the right and left lower links 23, an angle of right and left inclinations of the ground working machine is structured such as to be changed.

Next, a description will be given of a detailed structure of the cabin 7 with reference to FIGS. 1 and 2. The cabin 7 covering the control seat 8 on the travel machine body 2 is provided with a cabin frame 300 which constructs a vehicle frame. The cabin frame 300 is formed into an approximately box frame shape having a pair of right and left front support posts 301 which are positioned in front of the control seat 8, a pair of right and left rear support posts 302 which are positioned at the rear of the control seat 8, a front beam member 303 which couples between upper end portions of the front support posts 301, a rear beam member 304 which couples between upper end portions of the rear support posts 302, and right and left side beam members 305 which couple the upper end portions of the front support post 301 and the rear support post 302 arranged in the front and rear sides. A roof body 306 is detachably mounted onto the upper end side of the cabin frame 301, that is, a rectangular frame which is constructed by the front beam member 303, the rear beam member 304, and the right and left side beam members 305.

End portions in the longitudinal direction of right and left bottom frames 311 extending forward and backward are coupled to lower end sides of the front support posts 301 and the rear support posts 302. The floor panel 40 is provided in a tension manner in upper surface sides of the right and left bottom frames 311, the dash board 33 is provided in a rising manner in the front end side of the floor panel 40, and the control steering wheel 9 is installed to the rear surface side of the dash board 33 via the steering column 32. The brake pedal 35 is arranged in the upper surface side of the front portion in the floor panel 40, and the control seat 8 is attached to the upper surface side of the rear portion in the floor panel 40.

A front window glass 321 is arranged in the front surface side of the cabin frame 300, that is, an area in the front portion of the cabin 7 which is surrounded by the right and left front support posts 301, the front beam member 303, and the front end portion of the floor panel 40. A rear window glass 322 is arranged in the rear surface side of the cabin frame 300, that is, an area in the upper portion of the rear side in the cabin 7 which is surrounded by the right and left rear support posts 302 and the rear beam member 304. Right and left side doors 323 constructed by a transparent glass are arranged in the right and left side surface sides of the cabin frame 300, that is, an area in the side portions of the cabin 7 which is surrounded by the front support post 301 and the rear support post 302 arranged in the front and rear sides. Each of the side doors 323 is attached to the corresponding rear support post 302 via a pair of upper and lower hinges 324 so as to be openable and closable.

As is apparent from the arrangement structure of the front window glass 321, the rear window glass 322, and the right and left side doors 323, each of the support posts 301 and 302 and each of the beam members 303, 304, and 305 are positioned in the side edge portions of the cabin 7 (the cabin frame 300). More specifically, the window can be provided widely in the front and rear surfaces and the right and left side surfaces of the cabin frame 300. In the embodiment, the front window glass 321, the rear window glass 322, and the right and left side doors 323 made of the transparent glass are arranged in the front and rear surfaces and the right and left side surfaces of the cabin frame 300. As a result, the rigidity of the cabin frame 300 can be secured as well as the field of vision of the operator in the front and rear sides and the right and left sides can be widely secured.

As shown in FIGS. 13 to 19, a front side of the dash board 33 is covered with a heat shield plate (an air-cut plate) 901 for shielding heat from the engine 5 below the hood 6. Further, a front window glass 321 is constructed by one glass plate, and the air-cut plate 901 is connected to a back surface of the front window glass 321. Further, a urethane material 902 having both a heat shielding property and a sound insulating property is provided in a tension manner in a front surface of the front window glass 321. The urethane material 902 and the air-cut plate 901 are fixed to front and rear sides of the front window glass 321 by fastening a sheet metal frame 903 surrounding an outer periphery of the urethane material 902 and the air-cut plate 901 via the front window glass 321.

The dash board 33 covers a rear side of the front window glass 321 and is internally equipped with a wiper driving mechanism 422. The wiper driving mechanism 422 is constructed by a drive motor which generates rotary power to the wiper 421 axially supported to the front window glass 321, and a gear mechanism which transmits the rotary power of the drive motor to the wiper 421. The rotation of the drive motor is transmitted to the wiper 421 via the gear mechanism on the basis of the rotation of the drive motor in the wiper driving mechanism 422, and the wiper 421 rotates along a surface of the front window glass 321.

The wiper driving mechanism 422 is coupled and fixed to the air-cut plate 901. More specifically, the wiper driving mechanism 422 is firmly fixed to a rear surface of the air-cut plate 901, and the front window glass 321 is provided in a tension manner in a front surface side of the air-cut plate 901. Further, the drive shaft 422a of the wiper driving mechanism 422 is passed through the front window glass 321. The drive shaft 422a of the wiper driving mechanism 422 pivotally supports the wiper 421, and the wiper 421 rotates by the wiper driving mechanism 422.

Further, the urethane material (the sound insulation material) 902 surrounded by the sheet metal frame is provided in a tension manner in an area which faces to the air-cut plate 901 in the front surface of the front window glass 321, via a seal member. Further, the drive shaft 422a of the wiper driving mechanism 422 is passed through the urethane material 902. It is possible to prevent the noise from being transmitted to the air-cut plate 901 side from the engine 5, by the provision of the urethane material 902 in a tension manner in the front surface of the front window glass 321.

A meter control device (a meter ECU) 904 and an antenna 905 are firmly fixed to a rear surface of the air-cut plate 901, together with the wiper driving mechanism 422. Since the wiper driving mechanism 422, the meter ECU 904, and the antenna 905 can be constructed as one unit by being attached to the air-cut plate 901, it is possible to simplify an assembling work of each of the parts to the inner side of the dash board 33.

The dash board 33 is constructed by an inner board (an inside board) 33a and an outer board (an outside cover) 33b. The inner board 33a is fixed to a back surface of the air-cut plate 901 by coupling an outer peripheral edge of the inner board 33a to an outer peripheral edge of the air-cut plate 901. Further, the dash board 33 is formed by fitting the outer board 33b from an upper side of the inner board 33a so as to cover the upper portion of the inner board 33a. An opening portion 33c is provided in an upper side at the center of the inner board 33a, and the meter panel 906 is fixed to the front surface of the inner board 33a in such a manner that a display surface of the meter panel 906 is accommodated in the opening portion 33c.

Further, since the inner board 33a has a shape obtained by raising an outer peripheral portion of the opening portion 33c, the inner board 33a is set to a state of surrounding an outer side of the display portion in the meter panel 906 by a side wall 33d. As a result, since the display surface of the meter panel 906 can be arranged at a position which is far from the back surface of the dash board 33, it is possible to prevent reflection on the side door 323 of the cabin 7. As a result, there is no reflection on the basis of light generation of the display surface of the meter panel 906, and it is possible to prevent the field of vision of the operator from being disturbed at the traveling time or the working time.

The meter panel 906 is arranged in a state in which a panel surface thereof is inclined slightly upward from a rear side in such a manner that the meter panel 906 faces to the operator seating on the control seat 8 at a position in a lower side in front of the control steering wheel 9. Further, an outer edge of the meter panel 906 is covered with a side wall 33d of an inner board 33a which is upraised toward an outer side from an inner side. The inner board 33a is arranged a plurality of switch members 907, for example, a parking switch and a wiper switch, at a position coming to an outer periphery of the meter panel 906. Further, the key switch 61 is a rotary type switch which can be rotationally operated by a predetermined key inserted into a key hole, and is attached to a right position of the control steering wheel 9 in the dash board 33.

In the meter panel 906, a liquid crystal panel 908 for carrying out character representation is arranged in its center display area, and an engine speed meter 909 indicating a speed of rotation of the engine 5 with an indicator is provided in an outer periphery of the liquid crystal panel 908. Further, in the meter panel 906, a fuel meter 910 indicating a remaining amount of fuel with an indicator is arranged in a left side of the engine speed meter 909, and a water temperature meter 911 indicating a cooling water temperature of the engine 5 with an indicator is arranged in a right side of the engine speed meter 909.

Further, in the meter panel 906, a plurality of display lamps 912 and 913 constructed by LED are arranged in a display area in right and left outer sides of the engine speed meter 909 (an outer side of the central display area). The display lamp 912 arranged in the left side of the engine speed meter 909 acts, for example, as a warning light or an indication light regarding to a traveling system. Meanwhile, the display lamp 913 arranged in the right side of the engine speed meter 909 acts as a warning light or an indication light relevant to a working system. Further, one of the right and left display lamps 912 and 913 is operated as the warning light for minor failure, and the other is operated as the warning light for major failure. Further, in the case that the display lamp 912 in the left side is operated as the warning light or the indication light regarding to the traveling system, one of the display lamps 912 is allocated to a regeneration lamp indicating a regeneration treatment state of the exhaust gas purification device 224.

As shown in FIGS. 17 to 22, the steering column 32 is installed in such a manner as to be surrounded its periphery by the inner board 33b, and is provided in a rising manner in a state in which the steering column is buried in a back surface side of the dash board 33. A vertically long steering shaft 738 is axially provided within the steering column 32. In the steering shaft 738, an upper end of the steering wheel shaft 921 is protruded upward from the upper surface of the steering column 32, and the control steering wheel 9 having the approximately round shape in a plan view is attached to the upper end side of the steering wheel shaft 921. A leading end side of the vertically long connecting shaft 740 is coupled to the lower end side of the steering wheel shaft 921 via a universal joint 922. An operation shaft 742 of a power steering hydraulic mechanism 621 is coupled to a base end side of the connecting shaft 740 via a universal joint 741, the power steering hydraulic mechanism 621 being supported to a lower portion side of the board support plate (the air-cut plate) 901.

A tilt lever 915 and a telescopic lever 914 are arranged in a sorting manner in right and left sides of the steering column 32 where the control steering wheel 9 is arranged, the tilt lever 915 and the telescopic lever 914 adjusting a posture of the control steering wheel 9. More specifically, the telescopic lever 914 is axially supported in a lateral direction and rotates in a longitudinal direction, and is provided in the right side surface of the steering column 32. The tilt lever 915 is axially supported in a lateral direction and rotates in a longitudinal direction, and is provided in a lower side of the left side surface of the steering column 32. Further, a telescopic mechanism 917 and a tilt mechanism 918 are provided within the steering column 32, the telescopic mechanism 917 moving the control steering wheel 9 in an axial direction of the steering wheel shaft 921, and the tilt mechanism 918 tilting the control steering wheel 9 together with the steering wheel shaft 921.

A brake pedal support mechanism 916 having a brake pedal shaft 720 axially supporting the right and left brake pedals 35 is arranged in front of the steering column 32. The brake pedal support mechanism 916 is coupled and supported to a midstream portion of the air-cut plate 901. Further, the tilt mechanism 915 is installed in a lower side of the steering column 32, and is pivoted to a retaining bracket 919 which is coupled to the brake pedal support mechanism 916. More specifically, the tilt mechanism 918 is axially supported rotatably to the retaining bracket 919 which is firmly fixed to the air-cut plate 901 via the brake pedal support mechanism 916. Further, a telescopic mechanism 917 which can expand and contract on the basis of a multiple shaft structure is provided in an upper side of the tilt mechanism 918 within the steering column 32. Further, the steering column 32 is coupled to a leading end side of the telescopic mechanism 917.

The operator can release the fixation by the telescopic mechanism 917 by rotating the telescopic lever 914 to a near side, and can adjust the height position of the control steering wheel 9 by making the control steering wheel 9 movable along an axial direction of the steering wheel shaft 921, as shown in FIG. 20. At this time, since the steering column 32 is fixed to the leading end side of the telescopic mechanism 915, the steering column 32 can be moved up and down together with the operation steering wheel 9.

Figure 21:
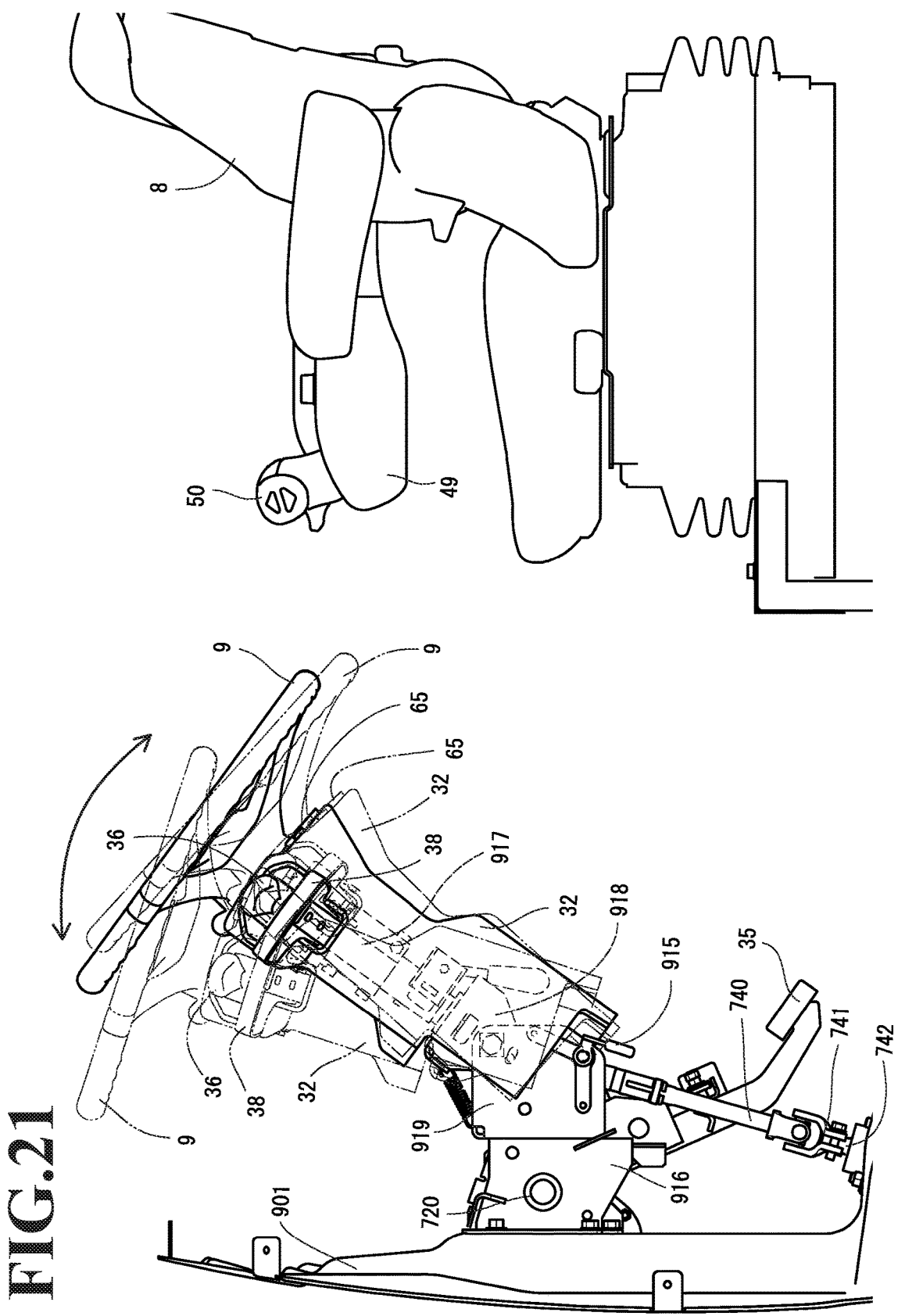
FIG. 21 is a view showing a tilt motion of the control steering wheel.

Further, the operator can release the fixation by the tilt mechanism 918 by rotating the tilt lever 915 to a near side, and can adjust an inclined position of the control steering wheel 9 by making the control steering wheel 9 rotatable around an axial center of a connection portion to the retaining bracket 919, as shown in FIG. 21. The tilt mechanism 918 can tilt the control steering wheel 9 together with the steering wheel shaft 921 by setting a connection portion between the lower end of the steering wheel shaft 921 and the universal joint 922 to an axial center.

Figure 22:
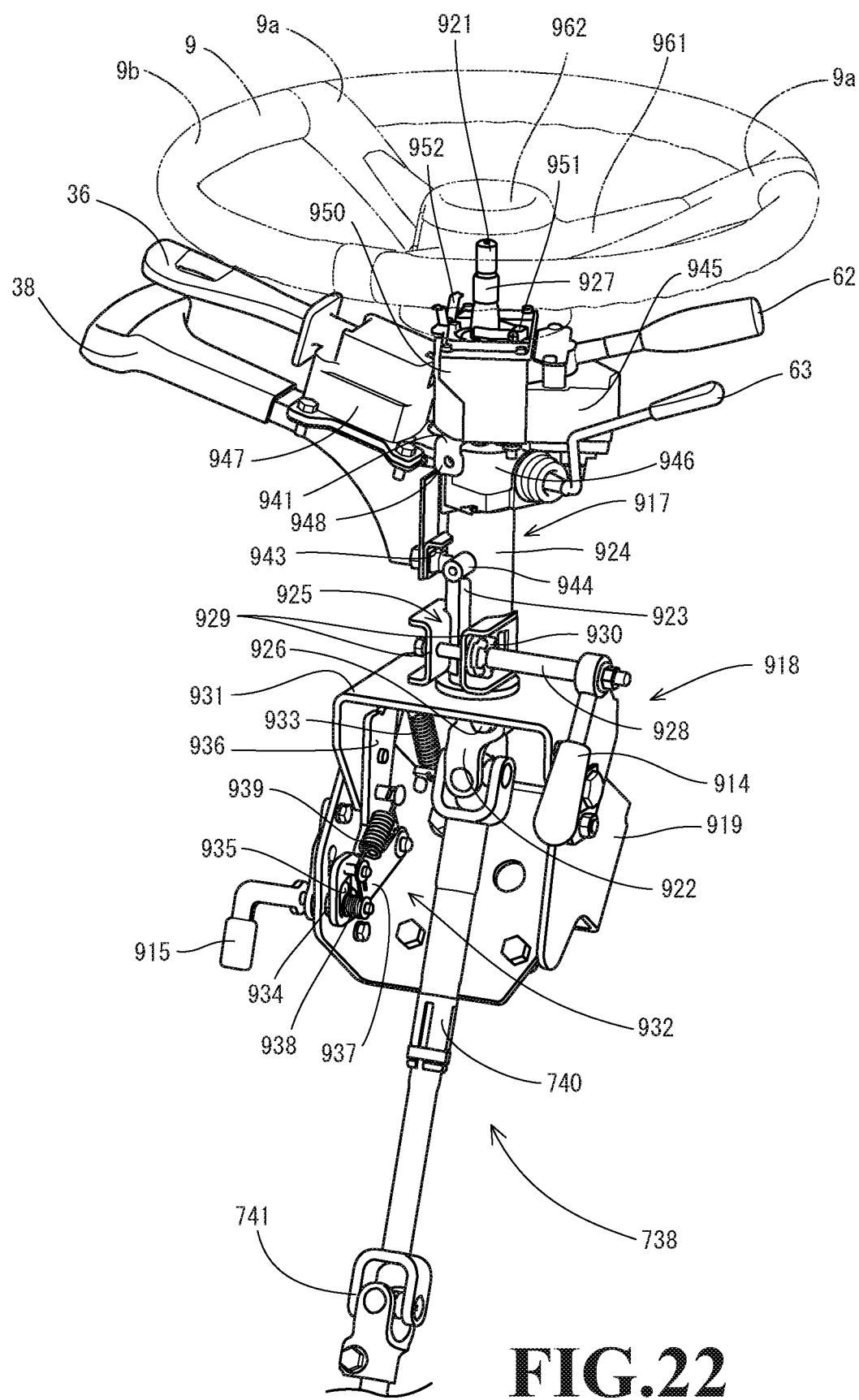
FIG. 22 is a perspective view showing a structure of a steering shaft.
Figure 23:
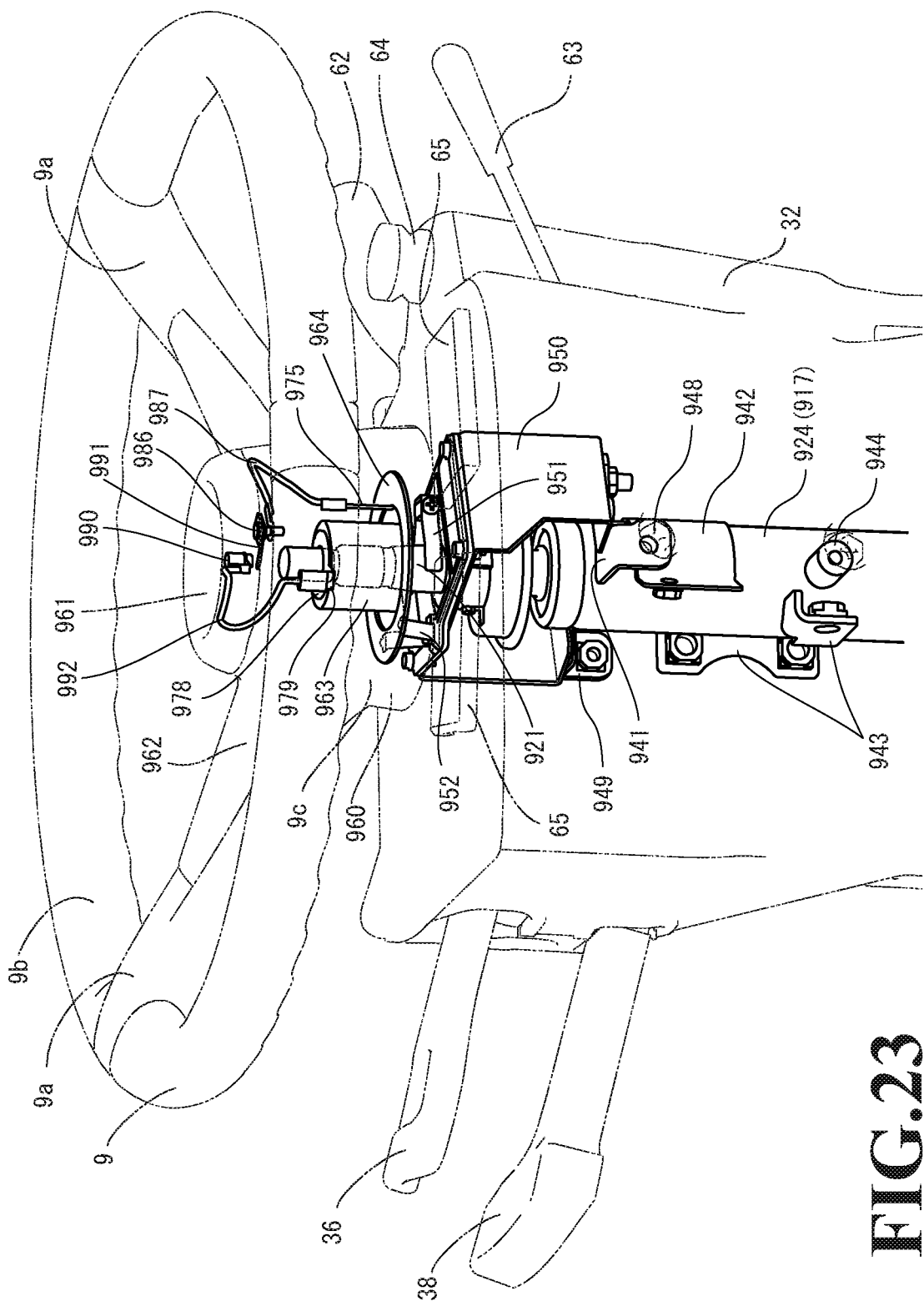
FIG. 23 is a perspective view showing a structure above the steering shaft.

As shown in FIG. 22, the telescopic mechanism 917 is provided with a column jacket 923 which axially supports the steering wheel shaft 921, an outer cover 924 which surrounds and supports the column jacket 923 from an upper side, and a loosely fastening member 925 which is provided in such a manner as to pinch both sides of a slit provided in a lower edge of the outer cover 924. The steering wheel shaft 921 is constructed by coaxially inserting a lower shaft 926 coupled to the universal joint 922 into a cylindrical upper shaft 927, and the lower shaft 926 and the upper shaft 927 are spline fitted or serration fitted. Therefore, the steering wheel shaft 921 is structured such that the upper shaft 927 can slide along an axial direction in relation to the fixed lower shaft 926, and the rotation from the upper shaft 927 can be transmitted to the lower shaft 926, and is axially supported rotatably to the column jacket 923.

The column jacket 923 is structured such that an upper jacket can slide in an axial direction in relation to a lower jacket, the upper jacket axially supporting the upper shaft 926 with a bearing, and the lower jacket axially supporting the lower shaft 927 with a bearing and being fixed to a movable bracket 931 mentioned later. The outer cover 924 has a cylindrical shape which is coupled to an upper end of the upper jacket in the column jacket 923, and has a slit which is notched in an axial direction from a lower edge thereof. Therefore, the upper jacket of the column jacket 923 and the outer cover 924 can move in the axial direction together with the upper shaft 927. Further, the telescopic mechanism 917 tilts together with the steering wheel shaft 921 on the basis of the tilting motion of the movable bracket 931 by fixing the lower jacket of the column jacket 923 to the movable bracket 931.

The loosely fastening member 925 inserts a fixing bolt 928 coupled to one end of the telescopic lever 914 into a pair of fixing plates 929 coupled to both sides of the slit of the outer cover 924, and changes a distance between a pair of fixing plates 929 by a fastening cam 930. More specifically, the outer cover 924 is loosely fastened and the telescopic mechanism 917 is released or fixed by making a pair of fixing plates 929 away from each other or close to each other with the fastening cam 930 on the basis of the interlocking motion of the fixing bolt 928 with the rotation of the telescopic lever 914. Further, a moving range achieved by the telescopic mechanism 917 is regulated by the provision of a regulation groove in the lower jacket of the column jacket 923 and the engagement of a regulation bolt fastened to the upper jacket of the column jacket 923 and the outer cover 924 with the regulation groove, although not being illustrated.

As shown in FIG. 22, the tilt mechanism 918 is structured such that a movable bracket 931 through which the steering wheel shaft 921 passes is axially supported to the retaining bracket 919, and is provided with a fixing member 932 which fixes an inclining posture of the movable bracket 931. The movable bracket 931 is formed into an approximately triangular shape in both right and left side surfaces, and is energized by axially supporting its one apex to the retaining bracket 919, and coupling its rear edge to an upper edge of the retaining bracket 919 with a coil spring 933. Further, the telescopic mechanism 917 is fixed to the upper surface of the movable bracket 931 through which the steering wheel shaft 921 is passed. Therefore, the steering wheel shaft 921 and the telescopic mechanism 917 tilt around the universal joint 922 by tilting the movable bracket 931 in relation to the retaining bracket 919.

The fixing member 932 is provided with a tilt lever 915 and a cam 935 in both ends of a support shaft 934 which is axially supported to the retaining bracket 919, and a fixing arm 937 engaged with a positioning plate 936 fixed to the movable bracket 931 is axially supported to the retaining bracket 919. The fixing arm 937 is coupled to the support shaft 934 by a coil spring 938, is coupled to the positioning plate 935 by a coil spring 939, and is energized from each of the support shaft 934 and the positioning plate 936. Further, the fixing arm 937 is provided with a hole portion which comes into contact with an outer peripheral surface of the cam 935, and the fixing arm 937 rotates on the basis of the rotation of the cam 935. The tilt mechanism 918 is released or fixed by rotating the fixing arm 937 and connecting or disconnecting the engagement portion between the positioning plate 936 and the fixing arm 937 on the basis of the interlocking motion of the cam 935 with the rotating motion of the tilt lever 915.

As shown in FIGS. 17 to 23, since the steering column 32 is fixed to the leading end side of the telescopic mechanism 917, the steering column 32 can be moved up and down (telescopically moved) and tilted (tiltably moved) together with the operation steering wheel 9. More specifically, the posture of the steering column 32 is structured such as to be changed working with the posture adjustment of the control steering wheel 9. Therefore, the support positions of the switches 64 and 65 and the levers 36, 62, and 63 arranged in the upper surface side of the steering column 32 can be adjusted working with the control steering wheel 9. As a result, the switches 64 and 65 and the levers 36, 62, and 63 can be supported to the easily operable positions in conformity to the field of vision of the seating operator.

In the steering column 32, the forward and backward movement switching lever 36 is provided in a protruding manner in its left side surface, and the erroneous operation prevention body 38 (the reverser guard) is arranged below the forward and backward movement switching lever 36. Further, in the steering column 32, the operation levers 62 and 63 include, for example, a wiper lever driving the wiper 421 and a lever for automatic cruise traveling the work vehicle at a fixed speed, and are provided in a protruding manner in the right side surface of the steering column 32.

The DPF regeneration switch 62 is provided in the upper surface of the steering column 32 in the base portion of the control steering wheel 9, the DPF regeneration switch 62 executing the regeneration control of the exhaust gas purification device 224. More specifically, the DPF regeneration switch 62 is arranged in the field of vision of the operator when the operator is under the straight moving work posture. Therefore, the seating operator can easily view the position of the DPF regeneration switch 64 and the lighting display state in a state in which the DPF regeneration switch 62 does not get behind the control steering wheel 9 or the operation levers 36, 62, and 63.

In the telescopic mechanism 917 in the steering shaft 738, a plurality of parts attaching stays 941 to 943 and a screw receiving member 944 are fixed to an outer peripheral surface of the outer cover 924 by welding. The upper end side stay 941 provided in an upper end of the outer cover 924 fastens and fixes a lever switch unit 945 which is provided with the operation lever 62. The right stay 942 provided in a right side surface of the outer cover 924 and in a lower side of the upper end side stay 941 fastens and fixes a lever switch unit 946 which is provided with the operation lever 63. The left stay 943 provided in a left side surface of the outer cover 924 and in a lower side of the right stay 941 fastens and fixes the erroneous operation prevention body 38.

A lever switch unit 947 provided with the forward and backward movement switching lever 36 is fastened and fixed to the upper surface of the erroneous operation prevention body 38. More specifically, the lever switch unit 947 for the forward and backward movement switching lever 36 is coupled to the left stay 943 via the erroneous operation prevention body 38. The steering column 32 is fastened by bolts to screw receiver portions 948 and 949 which are provided in front and rear edges of the upper end side stay 941, and a screw receiving member 944, and is fixed to the telescopic mechanism 917.

The upper end side stay 941 fastens and fixes a terminal stay 950 in such a manner as to cover the lever switch unit 945 which is fixed to an upper surface thereof. The terminal stay 950 is coupled to a front end and a rear end of the upper end side stay 941, and is fixed so as to overstride the lever switch unit 945. The terminal stay 950 opens its center area, and is structured such that a leading end of the steering wheel shaft 921 covered with the telescopic mechanism 917 can pass therethrough.

A first brush 951 and a second brush 952 electrically connected to a harness (not shown) are arranged at positions having different phases around the steering wheel shaft 921 on a surface which is a peripheral position of an opening portion, in the terminal stay 950. The first brush 951 is electrically connected to an outer peripheral surface in the leading end of the steering wheel shaft 921 by being in contact with a metal portion in the leading end of the steering wheel shaft 921 in such a manner as to pinch. The second brush 952 is positioned at a position which is away from a boss 963 mentioned later, is coupled to a harness (not shown) by fixing a midstream portion thereof to the terminal stay 950, and is electrically connected to a slip ring 964 by bending both ends thereof to a side of the control steering wheel 9 and bringing them into contact with a bottom surface of the slip ring 964 mentioned later.

A plurality of switches 65 such as the working switch and the one-touch automatic switch are arranged at positions which are bilaterally symmetrical about the steering wheel shaft 921 of the control steering wheel 9 in the upper surface of the steering column 32. Therefore, the seating operator can view a group of switches 65 which are arranged on the upper surface of the steering column 32 and can easily confirm the position of the working switch and the one-touch automatic switch. As a result, it is possible to reduce the erroneous operation.

The DPF regeneration switch 64, and the switches 65 such as the working switch and the one-touch automatic switch are provided on the upper surface of the steering column 32 in the base portion of the control steering wheel 9. Further, the DPF regeneration switch 64 is installed on the upper surface in one side of the steering column 32 above the brake pedal 35. Meanwhile, the switches 65 and 65 constructed by the working switch and the one-touch automatic switch are installed while having a spoke of the control steering wheel 9 arranged on the longitudinal center line of the travel machine body 2 therebetween. In the present embodiment, the switch 65 arranged in the left side is set to the working switch, and the switch 66 arranged in the right side is set to the one-touch automatic switch.

The control steering wheel 9 has a shape obtained by arranging a circular steering wheel 9b in an outer side of a Y-shaped spoke 9a which is axially supported its center (hub 9c) in the steering column 32. Therefore, in the control steering wheel 9, an area portion surrounded by the spoke 9a and the steering wheel 9b can be constructed as areas 9x, 9y, and 9z which can be viewed by the operator. In the case that the control steering wheel 9 is set to a straight traveling posture for traveling the traveling vehicle 1 straight, the meter panel 906 is arranged in the area 9x which is sandwiched by two upper spokes 9a. Further, the switches 65 and 65 provided in the steering column 32 are arranged in the left and right sides in a sorting manner, in the areas 9y and 9z which are sorted in the left and right sides around one lower spoke 9c.

At positions corresponding to the visible area 9y on the steering column 32, for example, there are arranged a 4-wheel drive/double speed/2-wheel drive selector switch 65a, a swing automatic selector switch 65b, and a swing and upward movement/backward movement and upward movement selector switch 65c. At positions corresponding to the visible area 9z on the steering column 32, for example, there are arranged a first automatic motion switch 65d, a display selector switch 65e, and a second automatic motion switch 65f.

The 4-wheel drive/double speed/2-wheel drive selector switch 65a is a switch which accepts the selection of the 4-wheel drive traveling mode, the double speed traveling mode, and the 2-wheel drive traveling mode. The swing automatic selector switch 65b is a switch which accepts the selection of the vehicle speed or the engine speed of rotation at the swing traveling time and the straight traveling time. The swing and upward movement/backward movement and upward movement selector switch 65c is a switch for designating an execution timing of an automatic upward movement of the working portion by the hydraulic elevating mechanism 22.

The first automatic work switch 65d is a switch for turning on and off the backward movement and upward movement control, the swing and upward movement control, the vehicle speed or speed of rotation selecting control, and the automatic braking control at the swinging time in a lump. The display selector switch 65e is a switch which accepts a display selection of the liquid crystal panel 908 in the meter panel 906. The second automatic work switch 65f is a switch for turning on and off the automatic rotary control, the engine load control, and the pitching control of the working portion in a lump.

Figure 24:
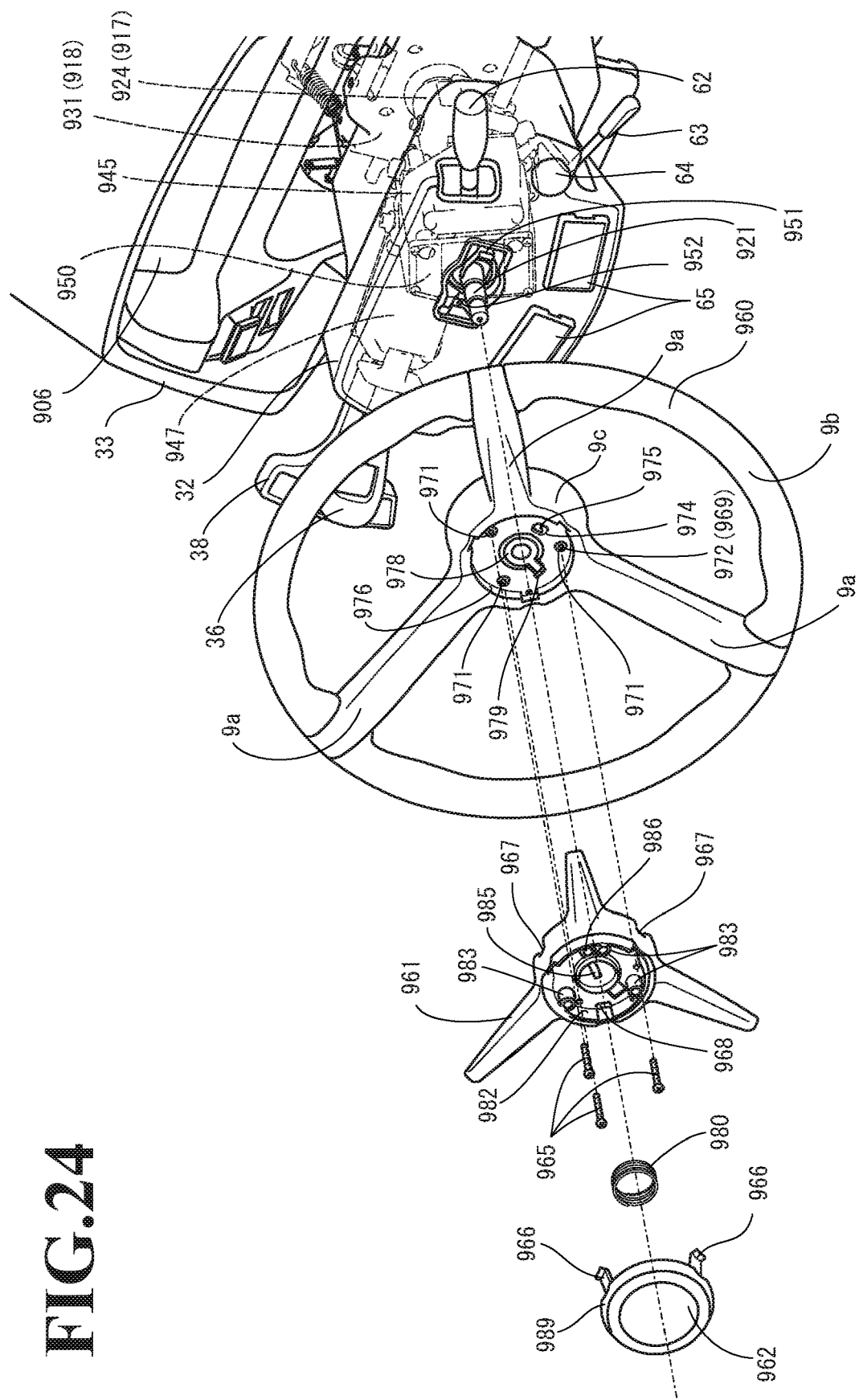
FIG. 24 is an exploded perspective view of the control steering wheel.
Figure 25:
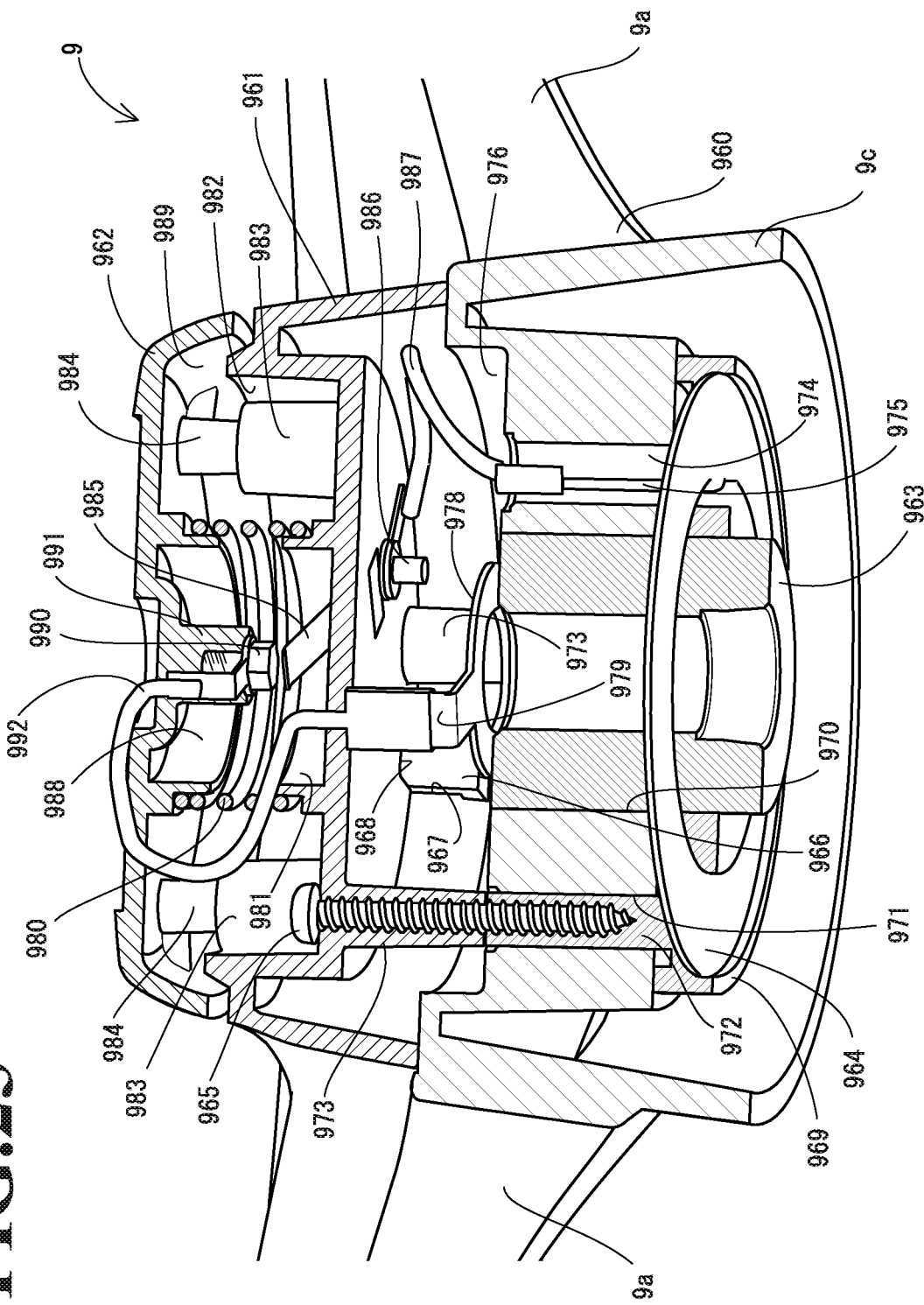
FIG. 25 is a perspective view of a cross section of the control steering wheel as seen from the below.
Figure 26:
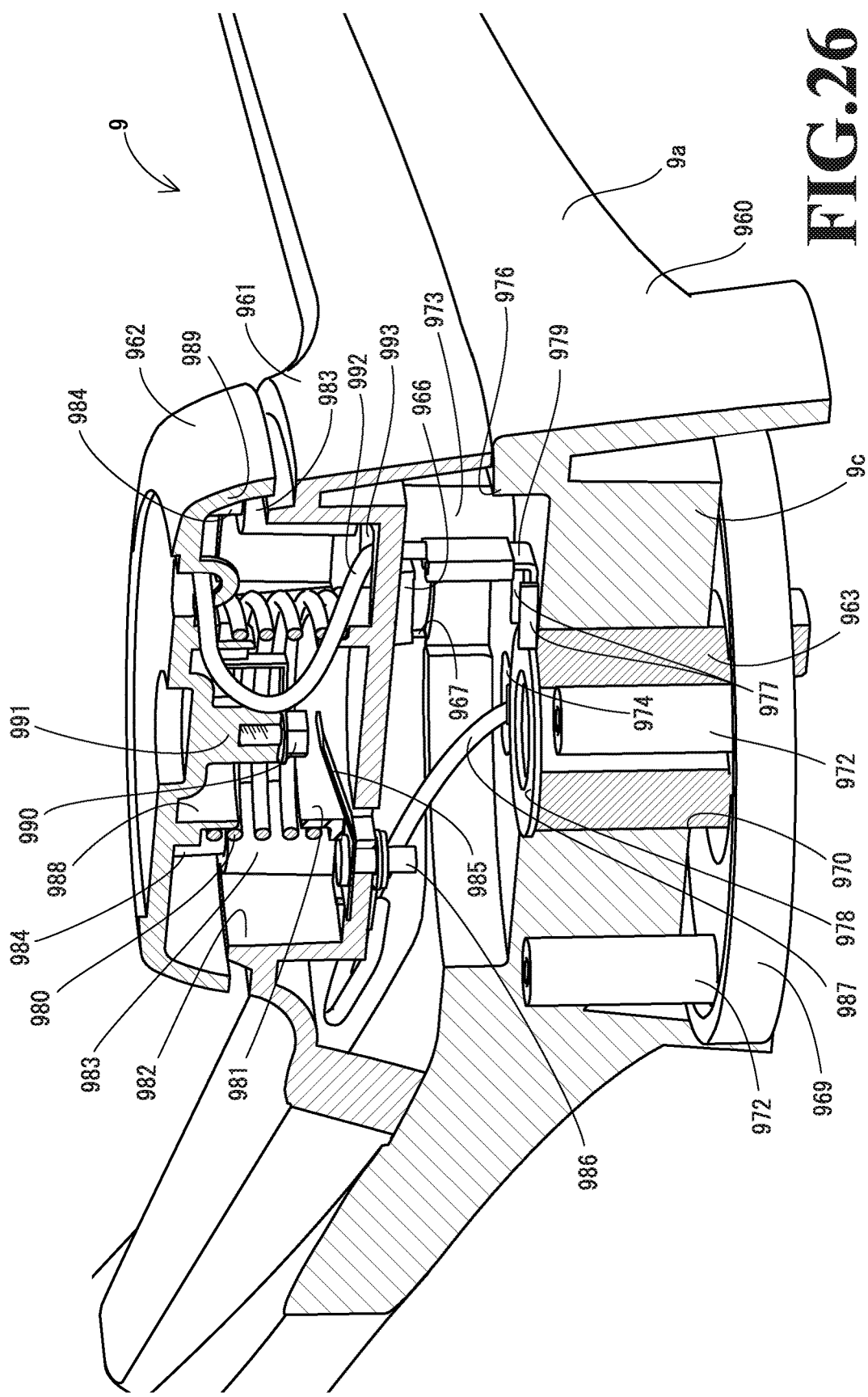
FIG. 26 is a perspective view of the cross section of the control steering wheel as seen from the above.

As shown in FIGS. 24 to 26, the control steering wheel 9 is provided with a steering wheel main body 960 which couples the rim (the steering wheel) 9b to the other end of the spoke 9a arranged radially outside from the hub 9c, a hub cover 961 which covers a part of an upper surface of the hub 9c and the spoke 9a in the steering wheel main body 960, and a cap 962 which covers an upper surface of the hub cover 961. The steering wheel main body 960 is provided with a cylindrical boss 963 at the center of the hub 9c, and is fixed to a leading end of the steering wheel shaft 921 by fitting the boss 963 to the leading end portion of the steering wheel shaft 921. The hub cover 961 is fastened to the steering wheel main body 960 by a screw 965 and is fixed onto the steering wheel main body 960.

The cap 962 is provided with a locking portion 966 so as to protrude downward (to a side of the hub cover 961) from an outer peripheral edge, the locking portion 966 being formed into a hook shape in its lower leading end. The locking portion 966 is locked to a locking groove 967 which is provided in the hub 9c of the steering wheel main body 960. The locking groove 967 is structured into a hook-shaped cross section in which an upper edge is bent toward an inner periphery so as to lock to the lower leading end of the outside bent locking portion 966. The hub cover 961 is provided with a locking through hole 968 in an outer peripheral portion in such a manner as to be in the same phase as the locking portion 966 of the cap 962 and the locking groove 967 of the steering wheel main body 960 in a peripheral direction. Since the locking portion 966 of the cap 962 passes through the locking through hole 968 of the hub cover 961 and locks to the locking groove 967 of the steering wheel main body 960, the cap 962 is fixed to the steering wheel main body 960 so as to pinch the hub cover 961 between the cap 962 and the steering wheel main body 960.

The steering wheel main body 960 is provided with a ring fixing member 969 having a ring shape in a lower surface of the hub 9c, and the slip ring 964 is fixed by protruding an outer peripheral edge in a lower surface of the ring fixing member 969 to a lower side. The steering wheel main body 960 has a through hole for fixing the boss 963 in a center of the hub 9c, the through hole into which the boss 963 having the cylindrical shape is inserted, and is provided with a plurality of through holes 971 for fixing the screw receivers 972 in an outer periphery of the through hole 970 for fixing the boss 963. The ring fixing member 969 is provided with a plurality of screw receivers 972 in a protruding manner on its upper surface, and is fixed to the lower surface of the hub 9c by inserting the screw receivers 972 into the through holes 971 of the steering wheel main body 960.

The hub cover 961 is provided with a plurality of screw receivers 973 so as to protrude toward a lower side, the screw receivers 973 being arranged at uniform intervals along the peripheral direction. The screw receivers 973 of the hub cover 961 are arranged at positions which correspond to the screw receivers 972 of the steering wheel main body 960. When the hub cover 961 is lapped over the steering wheel main body 960, the screw receivers 972 of the ring fixing member 969 and the screw receivers 973 of the hub cover 961 overlap up and down. Further, the hub cover 961 and the ring fixing member 969 are fixed to the steering wheel main body 960 by threadably inserting the screws 965 into the screw receivers 972 and 973.

There is provided which passes through the steering wheel main body 960 and the ring fixing member 969 in an axial direction, and a contact 975, which is protruding upward from an inner edge of the slip ring 964, is inserted into a through hole 974. The hub 9c and the ring fixing member 969 of the steering wheel main body 960 are constructed by an insulative material, and the boss 963 and the slip ring 964 which are constructed by a conductive material such as a metal part are insulated by the hub 9c and the ring fixing member 969.

An upper surface side of the hub 9c of the steering wheel main body 960 constructs an outer peripheral wall 976 by uprising an outer peripheral edge to an upper side (a side of the hub cover 961), and has such a shape that an inner side of the outer peripheral wall 976 is concaved to a lower side. A terminal fixing projection 977 is provided at a position which is different from the through hole 974 in the peripheral direction in an outer side of an outer peripheral edge of the through hole 974 on an upper surface of the hub 9c. A ring terminal 978 having an equal ring shape to the upper surface of the boss 963 is installed to the upper surface of the boss 963. The ring terminal 978 is provided with a contact 979 in which a part of an outer peripheral edge is protruded to an outer side, and is fixed in the upper surface of the boss 963 by fitting the contact 979 to the terminal fixing projection 977. The contact 979 of the ring terminal 978 has a shape of being bent toward the above (the side of the hub cover 961).

The hub cover 961 makes a portion between the hub cover 961 and the steering wheel main body 960 in a hollow state by protruding the screw receiver portion 973 downward from the lower surface, and bringing the screw receiver portion 973 into contact with the upper surface of the hub 9c of the steering wheel main body 960. The hub cover 961 is provided with a cylindrical spring holder 981 at the center of an upper surface thereof so as to protrude toward the above (the side of the cap 962), the spring holder 981 being fitted and inserted into the coil spring 980. An outer peripheral wall 982 is provided in a rising manner in an outer peripheral edge of the hub cover 961. A cylindrical guide receiving seat 983 is provided in a rising manner in an outer side of the upper surface of the hub cover 961 so as to be along the outer peripheral wall 982. The cap 961 is fixed to the hub cover 961 by inserting a cone shaped guide 984 into a guide hole of the guide receiving seat 983 of the hub cover 961, the guide 984 being protruded from the lower surface of the cap 961.

The hub cover 961 has the spring holder 981 which is provided with a through potion, comprising a part of an outer peripheral surface. A fixed contact point 985, having a leaf spring shape, is inserted into the relevant through portion from an outer side of the spring holder 981, and extends toward the center of the spring holder 981 (the hub cover 961). One end of the fixed contact point 985 is firmly fixed by a fixing pin 986 through which an outside portion of the spring holder 981 is passed, and one end of a harness 987 is firmly fixed to the other end of the fixing pin 986. The other end of the harness 987 is coupled to a contact 975 of the slip ring 964. More specifically, the fixed contact point 985 is electrically connected to the harness 987 via the fixing pin 986 in the hub cover 961, and the slip ring 964 is electrically connected to the harness 987 in the steering wheel main body 960. As a result, the fixed contact point 985 is electrically connected to the slip ring 964 via the fixing pin 986 and the harness 987.

The cap 962 is provided with a cylindrical spring holder 988 at the center of a lower surface thereof so as to protrude toward the below (the side of the hub cover 961), the spring holder 988 being fitted and inserted to the coil spring 980. An outer peripheral wall 989 is provided in a rising manner in an outer peripheral edge of the cap 962. The locking portion 966 is provided by extending a part of the outer peripheral wall 989 downward, and the locking portion 966 inserts the hub cover 961 therethrough so as to lock to the steering wheel main body 960, and fixes the cap 962 to the steering wheel main body 960. The coil spring 980 is inserted the spring holder 981 of the hub cover 961 into a lower end side thereof, is inserted the spring holder 988 of the cap 962 into an upper end side thereof, and is arranged at an axial center position in the hollow portion between the cap 962 and the hub cover 961. As a result, the cap 962 is energized by the coil spring 980 in relation to the hub cover 961.

The cap 962 is provided at the center of a lower surface thereof with a contact point fixing portion 991 which retains a movable contact point 990. The movable contact point 990 is positioned above the fixed contact point 985 of the hub cover 961 by fixing the movable contact point 990 to the contact point fixing portion 991, and a switch SW electrically connecting and disconnecting the horn (not shown) generating an alarm sound is constructed by the movable contact point 990 and the fixed contact point 985. The cap 962 is energized upward by the coil spring 980 which is fixed its one end to the hub cover 961, however, an upward energizing is regulated by locking the locking portion 966 to the locking groove 967 of the steering wheel main body 960. As a result, the operator can electrically connect the switch SW by pressing the cap 962 toward the hub cover 961 so as to bring the movable contact point 990 into contact with the fixed contact point 985. On the other hand, in the case that the operator does not press, the switch SW can be electrically disconnected by moving the movable contact point 990 away from the fixed contact point 985 on the basis of the energizing force of the coil spring 980.

The movable contact point 990 is threadably attached to the contact point fixing portion 991 together with one end of the harness 992, and is fixed to the center position in the lower surface of the cap 962 while being electrically connected to the harness 992. The harness 992 passes through a harness through hole 993 provided in the hub cover 961, and couples its other end to the contact 979 of the ring terminal 978. More specifically, the movable contact point 990 is electrically connected to the harness 992 in the cap 962, and the boss 963 is electrically connected to the harness 992 via the ring terminal 978 in the steering wheel main body 960. As a result, the movable contact point 990 is electrically connected to the boss 963 via the ring terminal 978 and the harness 992.

The fixed contact point 985 is electrically connected to the second brush 952 which comes into contact with the lower surface of the slip ring 964 by being electrically connected to the slip ring 964 via the fixing pin 986 and the harness 987. The movable contact point 990 is electrically connected to the first brush 951 which comes into contact with the outer peripheral surface of the steering wheel shaft 921 inserted into the boss 963 by being electrically connected to the boss 963 via the ring terminal 978 and the harness 992. Therefore, the first brush 951 and the second brush 952 are conducted by pressing the cap 962 toward the hub cover 961 and bringing the movable contact point 990 into contact with the fixed contact point 985.

The control steering wheel 9 is constructed by the steering wheel main body 960 which is axially supported to the steering wheel shaft 921, the hub cover 961 which covers the upper surface of the hub 9c in the center portion of the steering wheel main body 960, and the cap 962 which covers the upper surface of the hub cover 961. The cap 962 is provided with the first contact point (the movable contact point) 990 of the switch SW, and the hub cover 961 is provided with the second contact point (the fixed contact point) 985 of the switch SW. The first contact point 990 is electrically connected to the boss 963 which is provided at the axial center position of the steering wheel main body 960 and is fitted to the steering wheel shaft 921, and the second contact point 985 is electrically connected to the slip ring 964 which is provided in the lower surface of the hub 9c of the steering wheel main body 960 and is insulated from the boss 963.

As a result, the switch SW can be easily embedded in the control steering wheel 9 which is a rotary part, and it is possible to improve a workability in an assembling work and a maintenance work of the control steering wheel 9. Since the warning motion by the horn can be operated by the control steering wheel 9 by setting the switch SW to the horn switch, it is possible to improve an operability of the operator.

Figure 30:
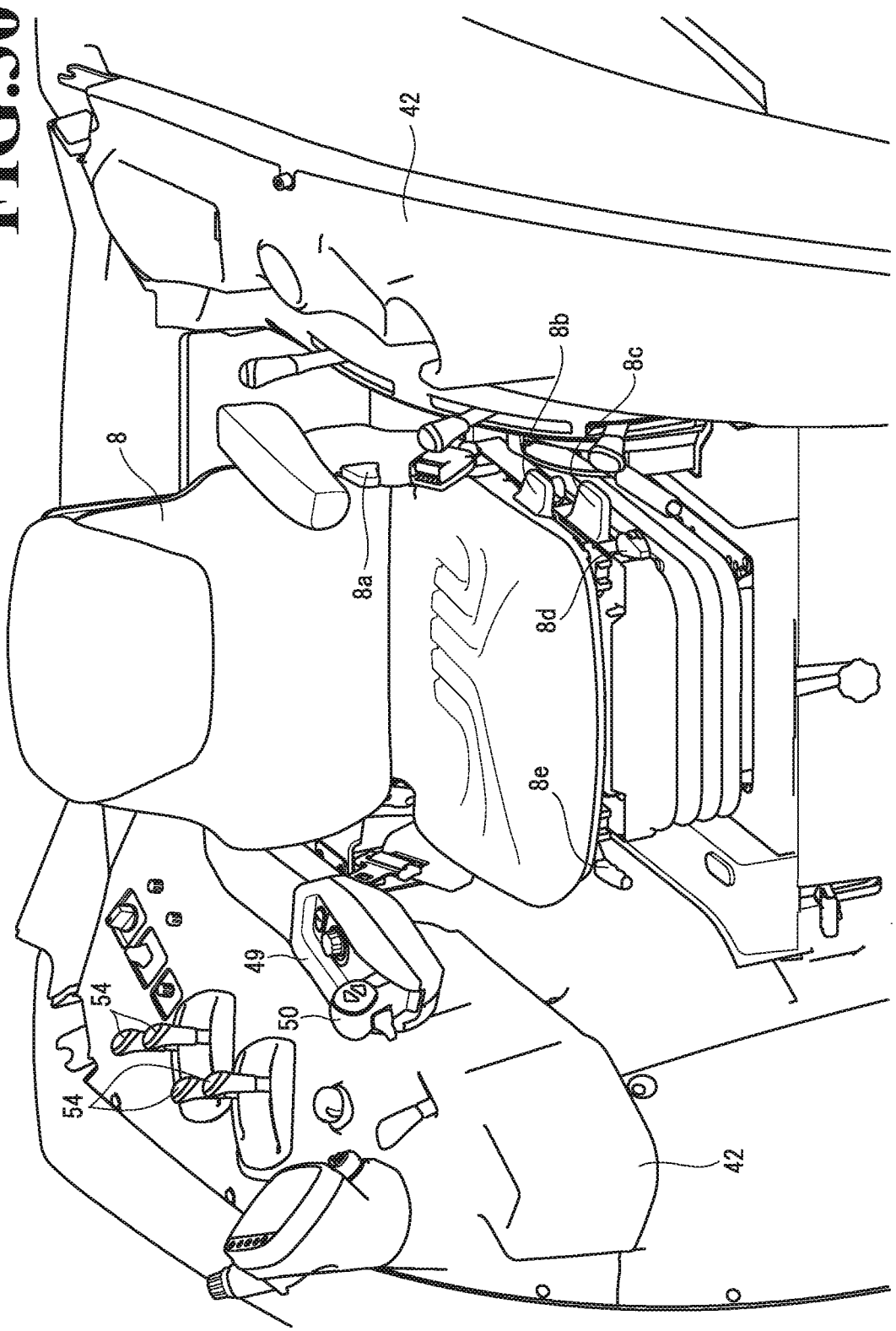
FIG. 30 is a flow chart showing a timing of a character representation at the non-work regeneration control time.

As shown in FIG. 30, a reclining adjusting lever 8a, a swivel adjusting knob 8b, a height adjusting knob 8c, and a lock lever 8d are arranged in a left side of the control seat 8 in this order from a rear side, the reclining adjusting lever 8a adjusting an inclined position of a back surface plate of the control seat 8, the swivel adjusting knob 8b adjusting a rotational position of a seat surface of the control seat 8 in a laterally horizontal direction, the height adjusting knob 8c adjusting a vertical height position of the seat surface of the control seat 8, and the lock lever 8d adjusting an inclined position of the seat surface of the control seat 8 in a longitudinally horizontal direction. Further, a back-and-forth adjusting lever 8e is arranged in a front right side of the control seat 8, the back-and-forth adjusting lever 8e adjusting a back-and-forth position of the seat surface of the control seat 8. The control seat 8 is constructed as an air suspension seat which is structured such as to adjust pneumatic pressure within a cushion arranged under the seat.

Since the levers 8a, 8d, and 8e and the knobs 8b and 8c are arranged around the control seat 8, not only the position and the posture of the seat of the control seat 8 can be adjusted in conformity to the physical condition of the operator, but also the control seat 8 can construct the air suspension seat and can absorb shock. Therefore, the operator seating on the control seat 8 can comfortably operate without being affected by a road surface state and a farm field state during the traveling.

Next, a description will be given of an example of a regeneration control of the DPF 224 according to the engine ECU 271 with reference to flow charts in FIGS. 27 and 28. More specifically, an algorithm (a program) shown by the flow charts in FIGS. 27 and 28 is stored in ROM in the engine ECU 271, and each of the regeneration controls mentioned above is executed by calling the algorithm to RAM and processing the algorithm by CPU.

Figure 27:
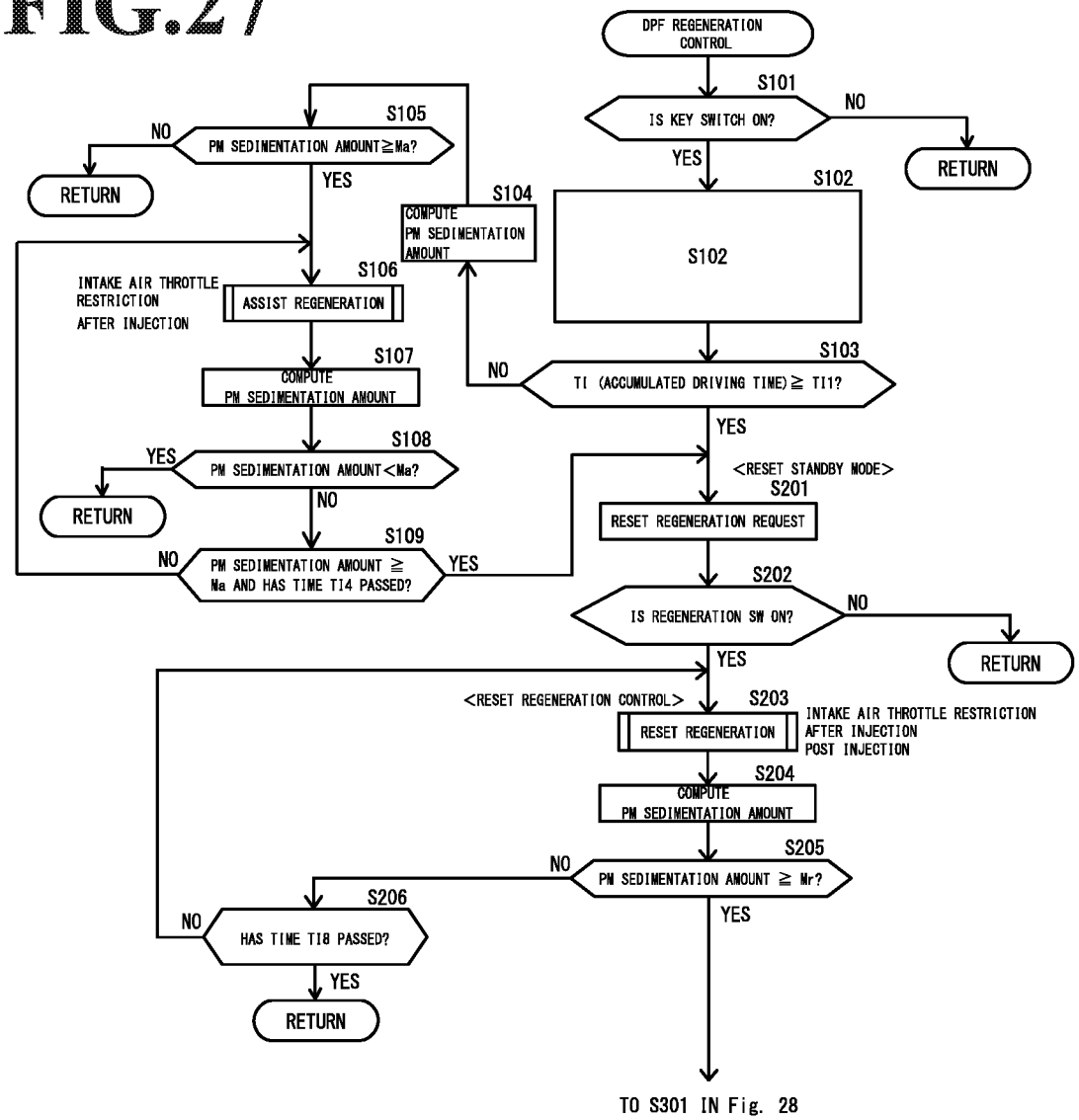
FIG. 27 is a perspective view showing a structure within a cabin.
Figure 28:
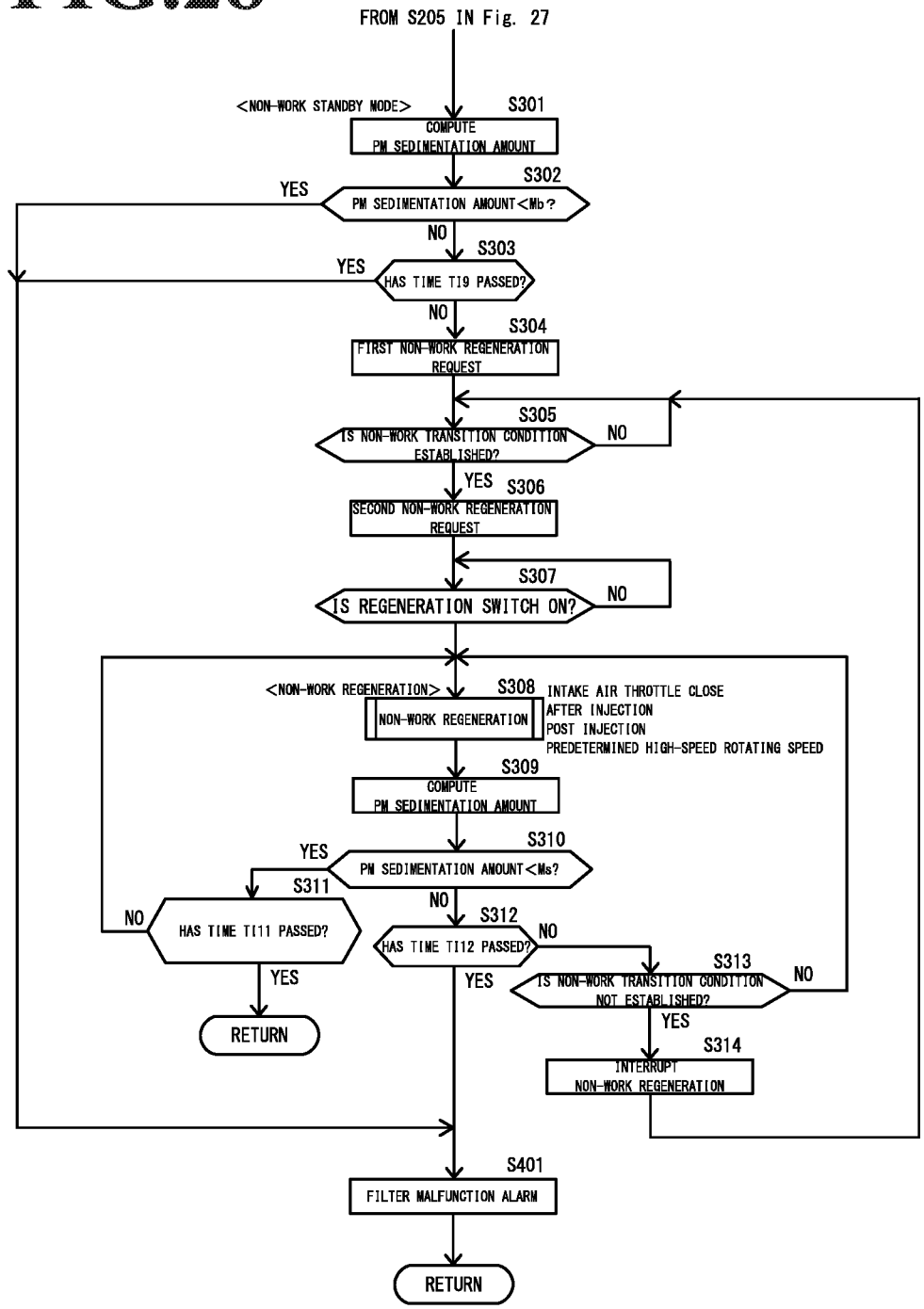
FIG. 28 is a flow chart of an assist regeneration control and a reset regeneration control.

As shown in FIG. 27, in a regeneration control of DPF 224, the step first of all reads detected values of an engine rotation sensor, a cooling water temperature sensor, a differential pressure sensor and a DPF temperature sensor, opening degrees of an intake air throttle member and an EGR valve member, and a fuel injection amount by a common rail (S102), if the key switch 61 is in an on state (S101: YES). Next, if an accumulated driving time TI from the past execution of the reset regeneration control or the non-work regeneration control is less than a set time TI1 (for example, 50 hours) (S103: NO), the step estimates a PM sedimentation amount within the DPF 224 (S104). The PM sedimentation amount estimation is carried out by using a P method which is based on the detected value of the differential pressure sensor and an exhaust gas flow rate map, and a C method which is based on the detected value of the engine rotation sensor, the fuel injection amount, a PM discharge amount map, and an exhaust gas flow rate map. If the PM sedimentation amount is equal to or more than a defined amount Ma (for example, 8 g/l) (S105: YES), the step executes an assist regeneration control (S106).

When the assist regeneration control is carried out, the step estimates the PM sedimentation amount within the DPF 224 on the basis of the detected value of the engine rotation sensor, the fuel injection amount, the PM discharge amount map, and the exhaust gas flow rate map (S107). If the PM sedimentation amount is less than the defined amount Ma (for example, 6 g/l) (S108: YES), the step finishes the assist regeneration control and goes back to the normal drive control. In the case that the PM sedimentation amount is equal to or more than the defined amount Ma (S108: NO), the step makes a transmission to a step S201 which is a reset standby mode before the reset regeneration control, if a predetermined time TI4 (for example, 10 minutes) has passed in this state (S109: YES).

In the case that the step goes back to the step S103 and the accumulated driving time TI is equal to or more than the set time TI1 (S103: YES), the step makes a transition to the step S201 which is the reset standby mode, and executes the reset regeneration request. In this stage, the regeneration lamp 912 and the regeneration switch 64 flash at a low speed (for example, 0.5 Hz), and a warning buzzer intermittently sounds at a low speed (for example, 0.5 Hz). At this time, the meter ECU 904 receives a command signal (a regeneration control request output) for executing the reset regeneration request from the engine ECU 271 through a CAN communication bus. The step sounds the warning buzzer at the low speed at the same time of flashing the regeneration lamp 912 at the low speed. Further, the step flashes the regeneration switch 64 at the low speed.

Further, in the step S201, the meter ECU 904 may display an operation command sign of character data "please hold down the regeneration switch", for example, on the liquid crystal panel 908, by switching the screen display of the liquid crystal panel 908 to a display on the basis of the reset regeneration request information prompting the execution of the reset regeneration control. Thereafter, in the case that the regeneration switch 64 is turned on for a predetermined time (for example, 3 seconds) (S202: YES), the step executes the reset regeneration control (S203). In this stage, the step turns on lights of the regeneration lamp 912 and the regeneration switch 64, and stops sounding the warning buzzer. Further, the screen display of the liquid crystal panel 908 may be transited from the reset regeneration request information to the reset regeneration execution information on the basis of the informing sign such as the character data "under reset regeneration".

The step estimates the PM sedimentation amount within the exhaust gas filter 50 (S204) during the execution of the reset regeneration control. In the case that the PM sedimentation amount is in a state of being less than a defined amount Mr (for example, 10 g/l) (S205: NO), the step finishes the reset regeneration control and goes back to the normal drive control if a predetermined time TI8 (for example, 30 minutes) has passed after the start of the reset regeneration control (S206: YES). At this time, the step turns off lights of the regeneration lamp 912 and the regeneration switch 64 for finishing the reset regeneration control. Further, in the case that the reset regeneration execution information is displayed on the liquid crystal panel 908, the screen display of the liquid crystal panel 908 is transited from the reset regeneration execution information to the normal information. On the other hand, if the PM sedimentation amount is equal to or more than the defined amount Mr (S205: YES), the reset regeneration control is assumed to be unsuccessful, and there is a risk of having a possibility of the PM excessive sedimentation. Therefore, the step makes a transition to a step S301 which is a parking standby mode before the non-work regeneration control.

As shown in FIG. 28, in the parking standby mode, the step first of all estimates the PM sedimentation amount within the DPF 224 (S301). Further, if the PM sedimentation amount is less than a defined amount Mb (for example, 12 g/l) (S302: NO) and within a predetermined time TI9 (for example, 10 hours) (S303: NO), the step executes a first non-work regeneration request (S304). In this stage, the regeneration switch lamp 345 keeps turning off the light, however, the regeneration lamp 912 and the engine malfunction lamp 912 flash at a high speed (for example, 1.0 Hz), and the warning buzzer intermittently sounds at a high speed (for example, 1.0 Hz). Further, as shown by a flow chart in FIG. 16 mentioned later, the screen display of the liquid crystal panel 908 may be switched to a display of a first non-work regeneration request index which preannounces the execution of the non-work regeneration control. The first non-work regeneration request index is structured, for example, such as to alternately switch and display the character data "stop agricultural portion" and the character data "park at safe place".

On the other hand, in the case that the PM sedimentation amount is equal to or more than the defined amount Mb (S302: YES), or the predetermined time TI9 (for example, 10 hours) has passed under the parking standby mode (S303: YES), there is a risk of having a possibility of the PM excessive sedimentation. Therefore, the step informs of the malfunction of the DPF 224 (STEP 401). At this time, the engine malfunction lamp 912 flashes at a high speed (for example, 1.0 Hz), and the warning buzzer sounds at a high speed (for example, 1.0 Hz). Meanwhile, the regeneration lamp 912 and the regeneration switch 64 keep turning off the lights. Further, the screen display of the liquid crystal panel 908 may be structured such as to be switched to a display of a malfunction warning sign which alternately changes the character data "exhaust gas filter malfunction" and the character data "communicate with sale store".

After the execution of the first non-work regeneration request in the step S304 mentioned above, the step stands ready until a preset non-work regeneration transition condition (an interlock release condition) is established (S305). The non-work regeneration transition condition shown in the step S305 is constructed by a neutral position of the forward and backward movement potentiometer (a neutral state of the forward and backward movement switching lever 36), an on state of the parking brake switch (a lock state by the parking brake lever 43), an off state of the PTO clutch switch 53, a low-idle rotational speed of the engine 5 (a minimum limit rotational speed under the no-load time), and a predetermined value (for example, 65° C.) or more of the detected value of the cooling water temperature sensor (an end of warming-up operation in the engine 5).

If the non-work regeneration transition condition (the interlock release condition) is established (YES) in the step S305, the step executes a second non-work regeneration request (S306). In this stage, the regeneration lamp 912 and the regeneration switch 64 flash at a low speed (for example, 0.5 Hz), the engine malfunction lamp 912 flashes at a high speed (for example, 1.0 Hz), and the warning buzzer is switched to an intermittent low-speed sound (for example, 0.5 Hz). Further, as shown by a flow chart in FIG. 16 mentioned later, the screen display of the liquid crystal panel 908 may be structured such as to be transited to the display on the basis of the second non-work regeneration request information prompting the execution of the non-work regeneration control. More specifically, the operation command sign of the character data "please hold down the regeneration switch" is displayed on the liquid crystal panel 908 in the same manner as the display on the basis of the reset regeneration request information in the step S201.

Further, if the regeneration switch 64 is turned on for a predetermined time (S307: YES), the step executes the non-work regeneration control (S308). More specifically, when the meter ECU 904 notifies the engine ECU 271 of reception of the on operation to the regeneration switch 64 from the operator, the engine controller 271 executes the non-work regeneration control. In this stage, the step turns on the lights of the regeneration lamp 912, the regeneration switch 64, and the engine malfunction lamp 912, and stops sounding the warning buzzer. As a result, the operator recognizes that the non-work regeneration control is executed, and it is possible to previously inhibit an erroneous operation of the operator when the non-work regeneration control is executed.

Figure 29:
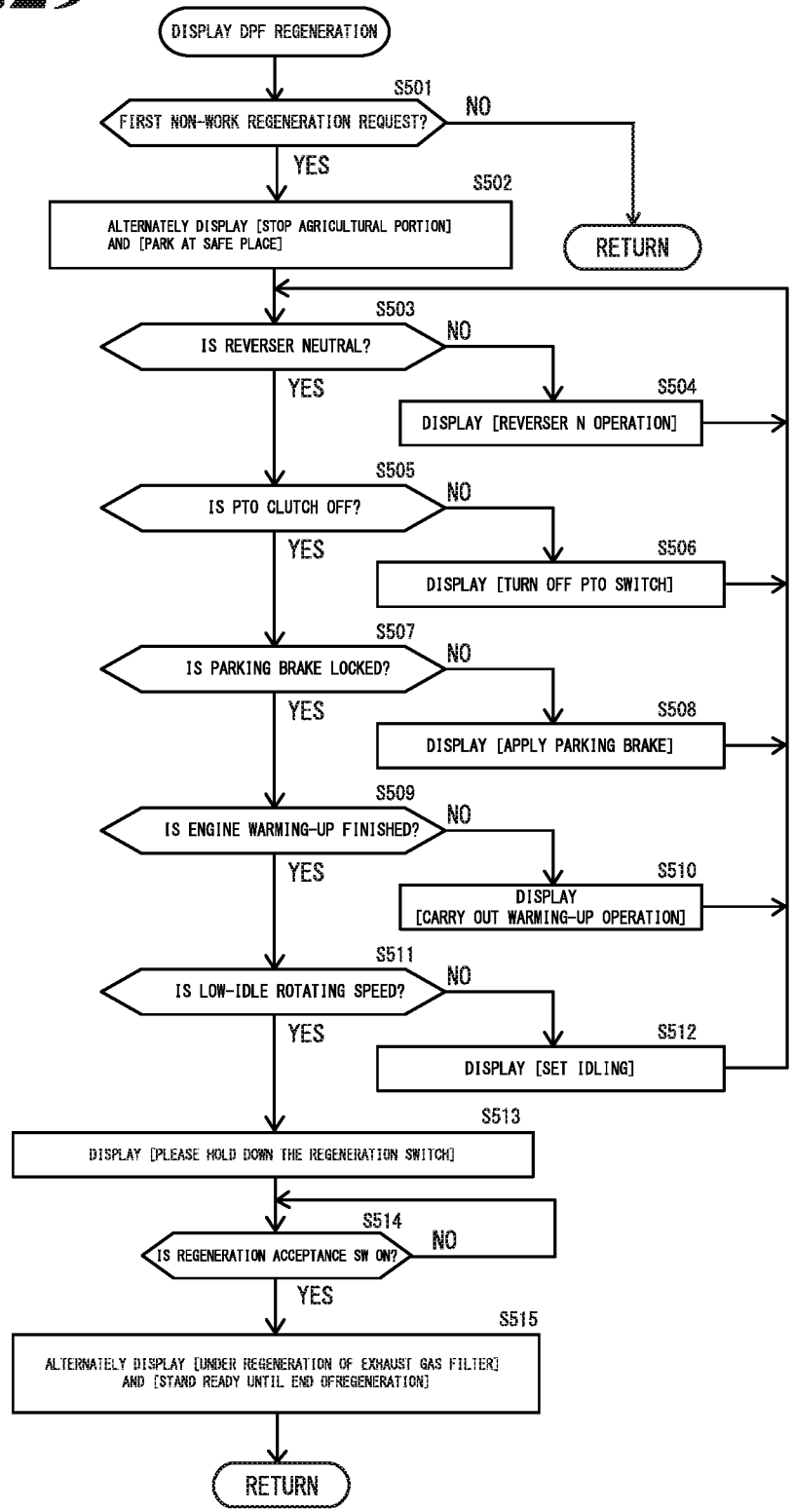
FIG. 29 is a flow chart of a non-work regeneration control.

Further, as shown by a flow chart in FIG. 29 mentioned later, the screen display of the liquid crystal panel 908 may be transited from the second non-work regeneration request information to the non-work regeneration execution information. Specifically, the non-work regeneration informing sign of alternately switching the character data "under regeneration of exhaust gas filter" and the character data "stand ready until end of regeneration" is displayed on the liquid crystal panel 908. More specifically, it is possible to previously inhibit the erroneous operation of the operator by structuring such as to display the matter that the operation of the present machine is inhibited until the regeneration control is finished.

During the execution of the non-work regeneration control, the step estimates the PM sedimentation amount within the DPR 224 (S309). If the PM sedimentation amount is less than a defined amount Ms (for example, 8 g/l) (S310: YES), and a predetermined time TI11 (for example, 30 minutes) has passed after the start of the non-work regeneration control (S311: YES), the step finishes the non-work regeneration control, and goes back to the normal drive control. In the case that the PM sedimentation amount is equal to or more than the defined amount Ms (S310: NO), the step assumes failure of the non-work regeneration control if a predetermined time TI12 (for example, 30 minutes) has passed under the state (S312: YES). Since there is a risk of having a possibility of the PM excessive sedimentation, the step makes a transition to a step S401 of informing of the malfunction of the exhaust gas filter 50.

In a state in which the non-work regeneration transition condition (the interlock release condition) is not established (S313: YES) due to the release of the lock state by the parking brake lever 43 during the execution of the non-work regeneration control, the step makes a transition to a step S304 and executes the first non-work regeneration request after interruption of the non-work regeneration control (S314). The step S312 is structured such as to determine whether or not the non-work regeneration control is interrupted on the basis of the state of non-establishment in the non-work regeneration transition condition (the interlock release condition), however, may be structured such as to interrupt the non-work regeneration control in the case that the regeneration switch 64 is pushed down during the execution of the non-work regeneration control. As a result, the non-work regeneration control of the DPF 224 can be interrupted without any troublesome operation such as the operation of stopping the engine 5 and interrupting the non-work regeneration control of the DPF 224.

A description will be given below of a display motion of the liquid crystal panel 908 when executing the non-work regeneration control, according to a flow chart in FIG. 30. When the meter ECU 904 receives the first non-work regeneration request from the engine ECU 271 in the step S304 (S501: YES), the meter ECU 904 displays the first non-work regeneration request index which alternately switches and displays the character data "stop agricultural portion" and the character data "park in safe place" on the liquid crystal panel 908 (S502). Further, the meter ECU 904 checks whether or not the forward and backward movement switching lever 36 is in a neutral state (S503). In the case that the forward and backward movement switching lever 36 is in a forward movement side or a backward movement side (S503: NO), the step displays an operation index on the basis of the character data "set reverser neutral" on the liquid crystal panel 908 for urging the operator to set the forward and backward movement switching lever 36 to the neutral state (S504).

Next, the meter ECU 904 checks on the basis of the signal from the PTO clutch switch 53 whether or not the PTO clutch switch 53 is in the off state (S505). In the case that the PTO clutch switch 53 is in the on state (S505: NO), the step displays an operation index on the basis of the character data "turn off PTO switch" on the liquid crystal panel 908 for urging the operator to turn off the PTO clutch switch 53 (S506).

Next, the meter ECU 904 checks whether or not the lock state is established by the parking brake lever 43 (S507). In the case that the parking brake switch is in the off state (S507: NO), the step displays an operation index on the basis of the character data "apply parking brake" on the liquid crystal panel 908 for urging the operator to set the lock state by the parking brake lever 43 (S508).

Next, the meter ECU 904 communicates with the engine ECU 271, and checks on the basis of the signal from the cooling water temperature sensor whether or not the warming-up operation of the engine 5 is finished (S509). In the case that the detected value by the cooling water temperature sensor is less than a predetermined value (for example, 65° C.) (S509: NO), the step displays an operation index on the basis of the character data "carry out warming-up operation" on the liquid crystal panel 908 for urging the operator to finish the warming-up operation of the engine 5 (S510).

Next, the meter ECU 904 communicates with the engine ECU 271, and checks on the basis of the signal from the engine rotation sensor whether or not the engine 5 is in a low idle rotational speed (S511). In the case that the engine 5 is not operated at the low idle rotational speed (S511: NO), the step displays an operation index on the basis of the character data "set idling" on the liquid crystal panel 908 for urging the operator to operate the engine 5 in the low idle (S512). In the case that all the conditions in the steps S503, S505, S507, S509, and S511 mentioned above are satisfied, the non-work regeneration transition condition is established. As a result, the step executes the second non-work regeneration request in the step S306 mentioned above, and displays the operation command sign on the basis of the character data "please hold down the regeneration switch" on the liquid crystal panel 908 (S513).

Thereafter, the step determines whether or not the operation of holding down the regeneration switch 64 is carried out (S514), in the same manner as the step S307 mentioned above. At this time, if the regeneration switch 64 is turned on for a predetermined time (S514: YES), the non-work regeneration informing sign alternately switching the character data "under regeneration of exhaust gas filter" and the character data "stand ready until end of regeneration" is displayed on the liquid crystal panel 908 (S515).

The structure of each of the portions in the present invention is not limited to the illustrated embodiments, but can be variously modified within the range which does not deflect from the scope of the present invention.

What is claimed is:

1. A work vehicle comprising:
a steering column which is arranged in front of a control seat which is provided on a travel machine body; and
a control steering wheel which has an approximately round shape in a plan view and is arranged in an upper end side of a steering wheel shaft which protrudes upward out of an upper surface of the steering column,
wherein the control steering wheel is constructed by spokes which are axially supported to the steering wheel shaft, and a steering wheel which is arranged in an outer side of the spokes,
wherein the steering wheel shaft extends along a steering wheel shaft axis, the steering wheel shaft axis extending through the upper surface of the steering column, and
wherein a plurality of switches are arranged at positions which are on the upper surface of the steering column and correspond to an area surrounded by the spokes and the steering wheel in the control steering wheel at a straight traveling position.

2. The work vehicle according to claim 1, wherein:
a meter panel is fixed to a dash board, and
the spokes of the control steering wheel are arranged in a Y-shaped form, and the meter panel is positioned between the spokes in the control steering wheel at the straight traveling position, thereby arranging the meter panel in a field of vision of an operator under a straight traveling work posture.

3. The work vehicle according to claim 2, wherein:
the dash board comprises an inside board to which the meter panel is fixed, and an outside cover which is fixed so as to cover the inside board from an upper side, and
the inside board is provided with an opening portion in which a display surface of the meter panel is arranged, and a side wall which is obtained by upraising an outer peripheral portion of the opening portion, and is formed into a shape in which an outer side of the display surface of the meter panel is formed by the side wall.

4. The work vehicle according to claim 1, wherein:
the control steering wheel is constructed by a steering wheel main body which is axially supported to the steering wheel shaft, a hub cover which covers an upper surface of a hub in a center portion of the steering wheel main body, and a cap which covers an upper surface of the hub cover,
a first contact point of an alarm switch is provided in the cap, a second contact point of the alarm switch is provided in the hub cover, and
the first contact point is electrically connected to a boss which is provided at a position of an axial center of the steering wheel main body and fitted to the steering wheel shaft, and the second contact point is electrically connected to a slip ring which is provided in a lower surface of the hub in the steering wheel main body and insulated from the boss.

5. The work vehicle according to claim 1, wherein the steering column comprises:
a left side surface extending from the upper surface;
a right side surface extending from the upper surface; and
one or more levers extending from each of the left side surface and the right side surface.

6. The work vehicle according to claim 5, wherein at least a portion of the left side surface is substantially perpendicular to the upper surface, and a portion of the right side surface is substantially perpendicular to the upper surface.

7. The work vehicle according to claim 5, wherein at least a portion of the left side surface of the steering column is parallel to the steering wheel shaft axis, and at least a portion of each of the right side surface of the steering column is parallel to the steering wheel shaft axis.

8. The work vehicle according to claim 1, wherein the steering wheel shaft axis extends along a back-and-forth direction of the travel machine body.

9. The work vehicle according to claim 1, wherein:
the control steering wheel is configured to rotate about the steering wheel shaft axis; and
the upper surface is planar and the steering wheel shaft axis passes through a central portion of the upper surface.

10. The work vehicle according to claim 9, wherein the upper surface is arranged orthogonal to the steering wheel shaft axis.

11. A work vehicle comprising:
a steering column configured to be positioned in front of a control seat of a travel machine body, the steering column comprising:
an upper surface; and
a side surface;
a steering wheel shaft which extends along a steering wheel shaft axis and protrudes upward out of the upper surface of the steering column;
a control steering wheel coupled to an upper end of the steering wheel shaft and configured to rotate about the steering wheel shaft axis, the control steering wheel comprising:
spokes that are axially supported to the steering wheel shaft; and
a steering wheel coupled to an outer side of the spokes and that circumscribes the spokes, the spokes and the steering wheel define one or more openings; and
a plurality of switches provided on the upper surface of the steering column; and
wherein the plurality of switches are configured to be visible through at least one of the one or more openings based on the control steering wheel being at a straight traveling position.

12. The work vehicle according to claim 11, wherein:
the control steering wheel is configured to rotate about the steering wheel shaft axis; and
the upper surface is planar and the steering wheel shaft axis passes through a central portion of the upper surface.

13. The work vehicle according to claim 11, wherein the steering wheel shaft axis extends through the upper surface of the steering column and the upper surface is arranged orthogonal to the steering wheel shaft axis.

14. The work vehicle according to claim 11, wherein the upper surface of the steering column has an outer edge and a portion of the side surface of the steering column extends away from the outer edge along the steering wheel shaft axis.

15. The work vehicle according to claim 14, wherein the outer edge defines an intersection of the upper surface and side surface of the steering column.

16. The work vehicle according to claim 11, further comprising:
a dash board provided on the traveling machine body; and
a meter panel coupled to the dash board;
wherein the dash board comprises:
an inside board coupled to the meter panel, and
an outside cover which is disposed over the inside board such that the outside cover covers an upper side of the inside board; and
wherein the inside board defines an opening portion in which a display surface of the meter panel is disposed, and a side wall is formed into a shape in which an outer side of the display surface of the meter panel is formed by the side wall.

17. The work vehicle according to claim 1, wherein:
a diesel particulate filter (DPF) regeneration switch, a working switch, and a one-touch automatic switch are provided on the upper surface of the steering column,
the DPF regeneration switch is provided on an upper surface of one side of the steering column above a brake pedal, and
the working switch and the one-touch automatic switch are positioned on a left side and a right side of a spoke of the spokes of the control steering wheel when the spoke is arranged in a vertical orientation.

* * * * *